(12) United States Patent
Song et al.

(10) Patent No.: US 8,605,385 B1
(45) Date of Patent: Dec. 10, 2013

(54) SPINDLE MOTOR AND HARD DISC DRIVE INCLUDING THE SAME

(71) Applicant: Samsung Electro-Mechanics Co., Ltd., Suwon (KR)

(72) Inventors: Jung Hwan Song, Suwon (KR); Shin Young Cheong, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/771,626

(22) Filed: Feb. 20, 2013

(30) Foreign Application Priority Data

Sep. 14, 2012 (KR) .................. 10-2012-0102155

(51) Int. Cl.
  *G11B 17/028* (2006.01)
  *F16C 17/10* (2006.01)
  *F16C 32/06* (2006.01)
  *H02K 7/08* (2006.01)

(52) U.S. Cl.
  USPC ............... 360/99.08; 384/107; 310/90

(58) Field of Classification Search
  USPC ......... 360/98.07, 99.08; 384/107, 114, 121; 310/67 R, 90
  See application file for complete search history.

(56) References Cited

U.S. PATENT DOCUMENTS

| 5,647,672 | A | 7/1997 | Fukutani |
|---|---|---|---|
| 6,211,592 | B1 | 4/2001 | Ichiyama |
| 6,339,270 | B1 | 1/2002 | Ichiyama |
| 7,293,917 | B2 * | 11/2007 | Jang et al. ............... 384/123 |
| 2004/0156569 | A1 * | 8/2004 | Takeuchi et al. ......... 384/107 |
| 2009/0285514 | A1 * | 11/2009 | Hori et al. .............. 384/107 |

FOREIGN PATENT DOCUMENTS

| JP | 2000-201459 | 7/2000 |
|---|---|---|
| JP | 2000-350408 | 12/2000 |
| JP | 2008-248916 | 10/2008 |
| KR | 1999-029633 | 4/1999 |
| KR | 2001-0080462 | 8/2001 |
| KR | 10-2007-0073597 | 7/2007 |

OTHER PUBLICATIONS

KIPO Decision to Grant a Patent issued Oct. 8, 2012 for corresponding Korean Application No. 10-2012-0102155.

* cited by examiner

*Primary Examiner* — Will J Klimowicz

(57) ABSTRACT

A spindle motor and a hard disc drive including the same are provided. The spindle motor including: a rotary member; and a fixed member rotatably supporting the rotary member by fluid dynamic pressure, wherein upper radial dynamic pressure generating grooves and lower radial dynamic pressure generating grooves are formed in at least one of surfaces of the rotary member and the fixed member facing each other in a radial direction, and thrust dynamic pressure generating grooves are formed in at least one of surfaces of the rotary member and the fixed member facing each other in an axial direction. In the thin spindle motor, a burden of slope rigidity may be transferred from the radial bearing to the thrust bearing so that the rotary member can have slope rigidity enough to be returned to its original position, when the rotary member is sloped to one side.

16 Claims, 9 Drawing Sheets

SPINDLE MOTOR AND HARD DISC DRIVE INCLUDING THE SAME

CROSS-REFERENCE TO RELATED APPLICATIONS

This application claims the priority of Korean Patent Application No. 10-2012-0102155 filed on Sep. 14, 2012, in the Korean Intellectual Property Office, the disclosure of which is incorporated herein by reference.

BACKGROUND OF THE INVENTION

1. Field of the Invention

The present invention relates to a spindle motor and a hard disc drive including the same.

2. Description of the Related Art

A hard disc drive (HDD), an information storage device, is a device for reading data stored on a disc or writing data to a disc with a read/write head.

A hard disc drive requires a disc driving device for driving a disc, and a small spindle motor is used in the disc driving device.

Such a small spindle motor employs a fluid dynamic pressure bearing assembly, in which a lubricating fluid is interposed between a shaft, a rotary member of the fluid dynamic pressure bearing assembly, and a sleeve, a fixed member of the fluid dynamic pressure bearing assembly, and the shaft is supported by fluid pressure generated in the lubricating fluid.

Also, a rotor hub, rotated together with the shaft and having a recording disc mounted thereon, is mounted on an upper side of the shaft. The rotor hub is fixedly coupled to an upper portion of the shaft and has a disc-like shape spread in a radial direction with the shaft as the center. Thus, a lubricating fluid is interposed between an upper surface of the sleeve and the rotor hub.

In the related art, a hard disc drive (HDD) used for a mobile device has a thickness of 9.5 mm, while an HDD used for a server has a thickness of 15 mm, so a spindle module installed therein may be formed to extend in an axial direction to a degree. Namely, since a bearing span of a vertical radial bearing is sufficiently secured, even in the case that a rotary member of the spindle motor is sloped to one side by external force or other force while rotating, the rotary member does not have a difficulty in being returned to its original position by the hydrodynamic condition of the vertical radial bearing formed between the shaft and the sleeve.

However, recently, as the size of electronic devices has been reduced, a thickness standard of a hard disc drive used in electronic devices is required to be 5 mm or smaller, and thus, a spindle motor used therein is formed to be significantly short in an axial direction.

Thus, as the length of the shaft is reduced relative to the related art spindle motor, it is difficult to form fluid dynamic pressure for returning the rotary member of the spindle motor to its original position when sloped to one side. Namely, a bearing span of the vertical radial bearing is too short to secure sufficient slope rigidity.

As a solution to a lack of slope rigidity according to a radial bearing, a method of increasing bearing rigidity by generating strong fluid dynamic pressure by reducing a bearing clearance, i.e., a gap between the shaft and the sleeve may be considered. In this case, however, if dynamic pressure is increased, frictional loss is increased, eventually leading to an undesirable increase in power consumption.

SUMMARY OF THE INVENTION

An aspect of the present invention provides a spindle motor in which even in case that a rotary member is sloped to one side, slope rigidity sufficient to return the rotary member to its original position is secured.

According to an aspect of the present invention, there is provided a spindle motor including: a rotary member; and a fixed member rotatably supporting the rotary member by fluid dynamic pressure, wherein upper radial dynamic pressure generating grooves and lower radial dynamic pressure generating grooves are formed in at least one of surfaces of the rotary member and the fixed member facing each other in a radial direction, thrust dynamic pressure generating grooves are formed in at least one of surfaces of the rotary member and the fixed member facing each other in an axial direction, and Equation 1 shown below is satisfied, $$(T_1 \cos \alpha_1 + T_2 \cos \alpha_2) L_T > (R_{U1} \sin \beta_{U1} + R_{U2} \sin \beta_{U2}) L_U + (R_{L1} \sin \beta_{L1} + R_{L2} \sin \beta_{L2}) L_L \quad \text{[Equation 1]}$$

wherein $T_1$ is a distance from the center of gravity of the rotary member to an inner edge of the thrust dynamic pressure generating grooves, $T_2$ is a distance from the center of gravity of the rotary member to an outer edge of the thrust dynamic pressure generating grooves, $\alpha_1$ is a smaller angle among angles formed between a line extended through the center of gravity of the rotary member in the radial direction and a line connecting the center of gravity of the rotary member and the inner edge of the thrust dynamic pressure generating grooves, $\alpha_2$ is a smaller angle among angles formed between a line extended through the center of gravity of the rotary member in the radial direction and a line connecting the center of gravity of the rotary member and the outer edge of the thrust dynamic pressure generating grooves, $L_T$ is a length of the thrust dynamic pressure generating grooves in the radial direction, $R_{U1}$ is a distance from the center of gravity of the rotary member to a lower edge of the upper radial dynamic pressure generating grooves, $R_{U2}$ is a distance from the center of gravity of the rotary member to an upper edge of the upper radial dynamic pressure generating grooves, $\beta_{U1}$ is a smaller angle among angles formed between a line extended through the center of gravity of the rotary member in the radial direction and a line connecting the center of gravity of the rotary member and the lower edge of the upper radial dynamic pressure generating grooves, $\beta_{U2}$ is a smaller angle among angles formed between a line extended through the center of gravity of the rotary member in the radial direction and a line connecting the center of gravity of the rotary member and the upper edge of the upper radial dynamic pressure generating grooves, $L_U$ is a length of the upper radial dynamic pressure generating grooves in the axial direction, $R_{L1}$ is a distance from the center of gravity of the rotary member to the lower edge of the lower radial dynamic pressure generating grooves, $R_{L2}$ is a distance from the center of gravity of the rotary member to the upper edge of the lower radial dynamic pressure generating grooves, $\beta_{L1}$ is a smaller angle among angles formed between a line extended through the center of gravity of the rotary member in the radial direction and a line connecting the center of gravity of the rotary member and the lower edge of the lower radial dynamic pressure generating grooves, $\beta_{L2}$ is a smaller angle among angles formed between a line extended through the center of gravity of the rotary member in the radial direction and a line connecting the center of gravity of the rotary member and the upper edge of the lower radial dynamic pressure generating grooves, and $L_L$ is a length of the lower radial dynamic pressure generating grooves in the axial direction.

In the spindle motor according to an embodiment of the present invention, in the case that the center of gravity of the rotary member is positioned above a lower edge of the upper radial dynamic pressure generating grooves in the axial direction, the term regarding $L_U$ in Equation 1 is 0, and Equation 2 shown below may be satisfied, $$(T_1 \cos \alpha_1 + T_2 \cos \alpha_2)L_T > (R_{L1} \sin \beta_{L1} + R_{L2} \sin \beta_{L2})L_L \quad \text{[Equation 2]}$$

In the spindle motor according to an embodiment of the present invention, in the case that the center of gravity of the rotary member is positioned below an upper edge of the lower radial dynamic pressure generating grooves in the axial direction, the term regarding $L_L$ in Equation 1 is 0, and Equation 3 shown below may be satisfied, $$(T_1 \cos \alpha_1 + T_2 \cos \alpha_2)L_T > (R_{U1} \sin \beta_{U1} + R_{U2} \sin \beta_{U2})L_U \quad \text{[Equation 3]}$$

In the spindle motor according to an embodiment of the present invention, the rotary member may include a shaft, a hub extending outwardly from an upper edge of the shaft in the radial direction, and a magnet and a disc installed on the hub, and the fixed member may include a sleeve rotatably supporting the shaft by fluid dynamic pressure and a core disposed to face the magnet and having a coil wound therearound.

In the spindle motor according to an embodiment of the present invention, the upper and lower radial dynamic pressure generating grooves may be formed in at least one of surfaces of the shaft and the sleeve facing each other, and the thrust dynamic pressure generating grooves may be formed in at least one of surfaces of the hub and the sleeve facing each other.

In the spindle motor according to an embodiment of the present invention, a bearing clearance filled with a fluid may be formed between surfaces of the shaft and the sleeve facing each other, and the bearing clearance may fall within 0.0005 to 0.002 times a diameter of the shaft.

In the spindle motor according to an embodiment of the present invention, when power supply to the spindle motor is stopped according to an embodiment of the present invention, back electromotive force (B-EMF) may be 0.35V/krpm or more.

According to another aspect of the present invention, there is provided a hard disc drive including: a spindle motor; a magnetic head for writing data to and reading data from the disc; and a head transfer unit transferring the magnetic head to a certain position above the disc, wherein a thickness standard is 5 mm.

According to another aspect of the present invention, there is provided a spindle motor including: a rotary member; and a fixed member rotatably supporting the rotary member by fluid dynamic pressure, wherein upper radial dynamic pressure generating grooves and lower radial dynamic pressure generating grooves are formed in at least one of surfaces of the rotary member and the fixed member facing each other in a radial direction, upper thrust dynamic pressure generating grooves are formed in at least one of surfaces of an upper portion of the rotary member and the fixed member facing each other in an axial direction, lower thrust dynamic pressure generating grooves are formed in at least one of surfaces of a lower portion of the rotary member and the fixed member facing each other in an axial direction, and Equation 4 shown below is satisfied, $$(T_{U1} \cos \alpha_{U1} + T_{U2} \cos \alpha_{U2})L_{TU} + (T_{L1} \cos \alpha_{L1} + T_{L2} \cos \alpha_{L2})L_{TL} > (R_{U1} \sin \beta_{U1} + R_{U2} \sin \beta_{U2})L_U + (R_{L1} \sin \beta_{L1} + R_{L2} \sin \beta_{L2})L_L \quad \text{[Equation 4]}$$

Here, $T_{U1}$ is a distance from the center of gravity of the rotary member to an inner edge of the upper thrust dynamic pressure generating grooves, $T_{U2}$ is a distance from the center of gravity of the rotary member to an outer edge of the upper thrust dynamic pressure generating grooves, $\alpha_{U1}$ is a smaller angle among angles formed between a line extended through the center of gravity of the rotary member in the radial direction and a line connecting the center of gravity of the rotary member and the inner edge of the upper thrust dynamic pressure generating grooves, $\alpha_{U2}$ is a smaller angle among angles formed between a line extended through the center of gravity of the rotary member in the radial direction and a line connecting the center of gravity of the rotary member and the outer edge of the upper thrust dynamic pressure generating grooves, $L_{TU}$ is a length of the upper thrust dynamic pressure generating grooves in the radial direction, $T_{L1}$ is a distance from the center of gravity of the rotary member to an inner edge of the lower thrust dynamic pressure generating grooves, $T_{L2}$ is a distance from the center of gravity of the rotary member to an outer edge of the lower thrust dynamic pressure generating grooves, $\alpha_{L1}$ is a smaller angle among angles formed between a line extended through the center of gravity of the rotary member in the radial direction and a line connecting the center of gravity of the rotary member and the inner edge of the lower thrust dynamic pressure generating grooves, $\alpha_{L2}$ is a smaller angle among angles formed between a line extended through the center of gravity of the rotary member in the radial direction and a line connecting the center of gravity of the rotary member and the outer edge of the lower thrust dynamic pressure generating grooves, $L_{TL}$ is a length of the lower thrust dynamic pressure generating grooves in the radial direction, $R_{U1}$ is a distance from the center of gravity of the rotary member to the lower edge of the upper radial dynamic pressure generating grooves, $R_{U2}$ is a distance from the center of gravity of the rotary member to the upper edge of the upper radial dynamic pressure generating grooves, $\beta_{U1}$ is a smaller angle among angles formed between a line extended through the center of gravity of the rotary member in the radial direction and a line connecting the center of gravity of the rotary member and the lower edge of the upper radial dynamic pressure generating grooves, $\beta_{U2}$ is a smaller angle among angles formed between a line extended through the center of gravity of the rotary member in the radial direction and a line connecting the center of gravity of the rotary member and the upper edge of the upper radial dynamic pressure generating grooves, $L_U$ is a length of the upper radial dynamic pressure generating grooves in axial direction, $R_{L1}$ is a distance from the center of gravity of the rotary member to the lower edge of the lower radial dynamic pressure generating grooves, $R_{L2}$ is a distance from the center of gravity of the rotary member to the upper edge of the lower radial dynamic pressure generating grooves, $\beta_{L1}$ is a smaller angle among angles formed between a line extended through the center of gravity of the rotary member in the radial direction and a line connecting the center of gravity of the rotary member and the lower edge of the lower radial dynamic pressure generating grooves, $\beta_{L2}$ is a smaller angle among angles formed between a line extended through the center of gravity of the rotary member in the radial direction and a line connecting the center of gravity of the rotary member and the upper edge of the lower radial dynamic pressure generating grooves, and $L_L$ is a length of the lower radial dynamic pressure generating grooves in the axial direction.

In the spindle motor according to an embodiment of the present invention, in the case that the center of gravity of the rotary member is positioned above a lower edge of the upper radial dynamic pressure generating grooves in the axial direction, the term regarding $L_U$ in Equation 4 is 0, and Equation 5 shown below may be satisfied, $(T_{U1} \cos \alpha_{U1} + T_{U2} \cos \alpha_{U2})L_{TU} + (T_{L1} \cos \alpha_{L1} + T_{L2} \cos \alpha_{L2})L_{TL} > (R_{L1} \sin \beta_{L1} + R_{L2} \sin \beta_{L2})L_L$  [Equation 5]

In the spindle motor according to an embodiment of the present invention, in the case that the center of gravity of the rotary member is positioned below an upper edge of the lower radial dynamic pressure generating grooves in the axial direction, the term regarding $L_L$ in Equation 4 is 0, and Equation 6 shown below may be satisfied, $(T_{U1} \cos \alpha_{U1} + T_{U2} \cos \alpha_{U2})L_{TU} + (T_{L1} \cos \alpha_{L1} + T_{L2} \cos \alpha_{L2})L_{TL} > (R_{U1} \sin \beta_{U1} + R_{U2} \sin \beta_{U2})L_U$  [Equation 6]

In the spindle motor according to an embodiment of the present invention, the rotary member may include a hollow-type sleeve, a hub extending outwardly of the sleeve in the radial direction, and a magnet and a disc installed on the hub, and the fixed member may include a shaft positioned in the hollow of the sleeve to rotatably support the sleeve by fluid dynamic pressure, upper and lower thrust members extending outwardly in the radial direction of the shaft, and a core disposed to correspond to the magnet and having a coil wound therearound.

In the spindle motor according to an embodiment of the present invention, the upper and lower radial dynamic pressure generating grooves may be formed in at least one of surfaces of the shaft and the sleeve facing each other, the upper thrust dynamic pressure generating grooves may be formed in at least one of surfaces of the upper thrust member and the sleeve facing each other, and the lower thrust dynamic pressure generating grooves may be formed in at least one of surfaces of the lower thrust member and the sleeve facing each other.

In the spindle motor according to an embodiment of the present invention, a bearing clearance filled with a fluid may be formed between surfaces of the shaft and the sleeve facing each other, and the bearing clearance may fall within 0.0005 to 0.002 times a diameter of the shaft.

In the spindle motor according to an embodiment of the present invention, when power supply to the spindle motor is stopped according to an embodiment of the present invention, back electromotive force (B-EMF) may be 0.35V/krpm or more.

According to another aspect of the present invention, there is provided a hard disc drive including: a spindle motor; a magnetic head for writing data to and reading data from the disc; and a head transfer unit transferring the magnetic head to a certain position above the disc, wherein a thickness standard is 5 mm.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
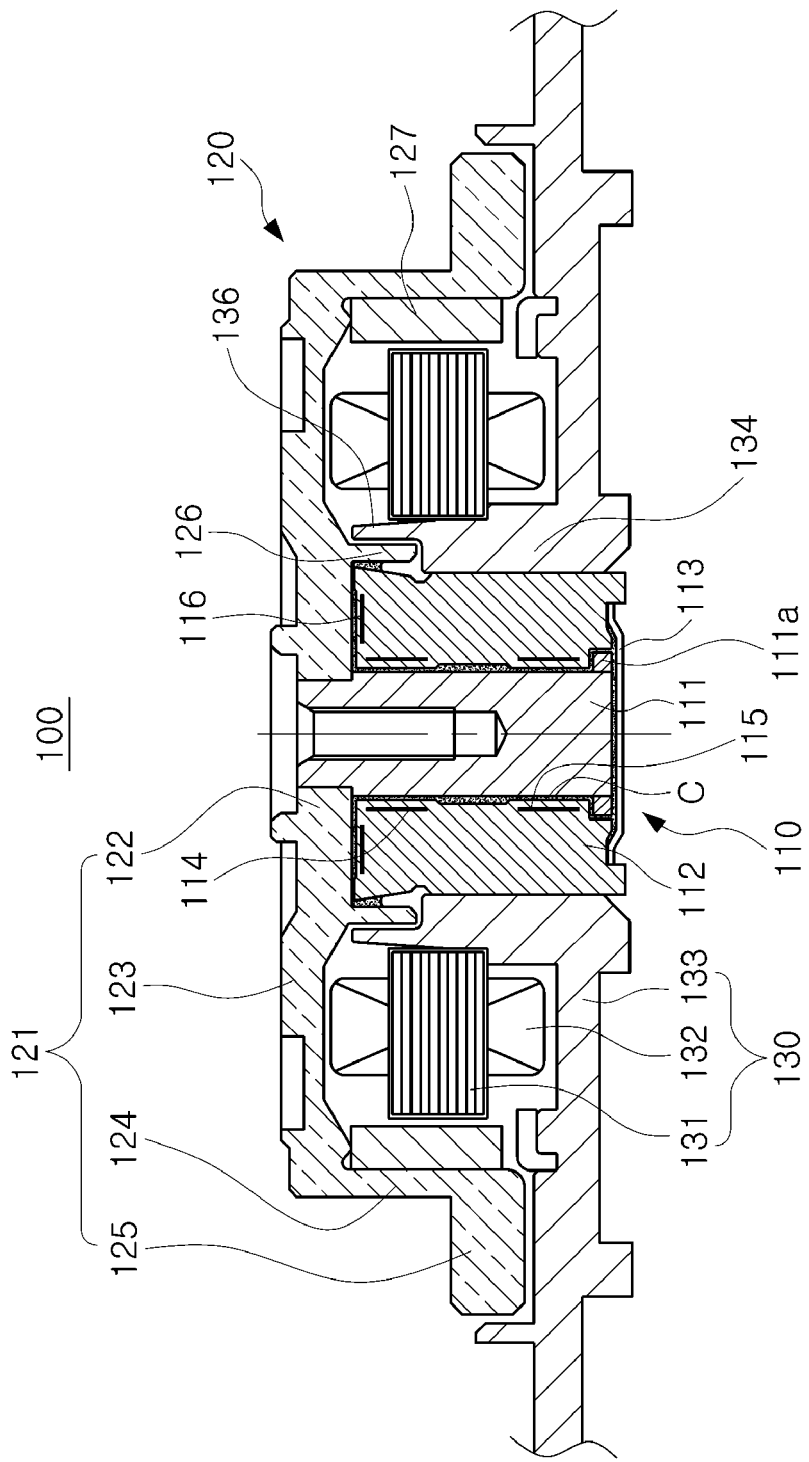
FIG. 1 is a schematic cross-sectional view of a spindle motor according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

FIG. 1 is a schematic cross-sectional view of a spindle motor according to an embodiment of the present invention.

Referring to FIG. 1, a spindle motor 100 according to an embodiment of the present invention may include a fluid hydrodynamic bearing 110 including a shaft 111, a rotor 120, and a sleeve 112, the rotor including a hub, and a stator 30 including a base member 133 and a core 131, around which a coil 132 is wound.

First, referring to definitions of terms of directions, an axial direction may refer to a vertical direction based on the shaft 111, and outer and inner radial directions may refer to an outer edge direction of the hub 121 based on the shaft 111 and a central direction of the shaft 111 based on an outer edge of the hub 121, respectively. Also, a circumferential direction may refer to a rotational direction with a rotational shaft as the center in a position spaced apart by a certain distance from the center of the rotational shaft in the radial direction.

In addition, a rotary member described hereinafter is a rotating member including the rotor including the shaft 111 and the hub 121, a magnet 127 installed therein, and the like, and a fixed member refers to the remaining members such as the sleeve 112, the stator 130, a base member 133, and the like, excluding the rotary member, which are fixed, relative to the rotary member.

The fluid dynamic pressure bearing assembly 110 may include the shaft 111, the sleeve 112, a stopper 111a, and a hub 121, and the hub 121 may be a component constituting the rotor 120 as described hereinafter and a component constituting the fluid dynamic pressure bearing assembly 110 as well.

The sleeve 112 may rotatably support the shaft 111.

Here, the shaft 111 is inserted into a hole of the sleeve 112 in the axial direction to have a small clearance, forming a bearing clearance C. The shaft 111 may have a diameter equal to 4 mm or smaller. The bearing clearance may be filled with oil. The bearing clearance C may be formed to have a size equal to 0.00005 to 0.002 times a diameter D of the shaft 111. In other words, a value obtained by dividing the bearing clearance C by the diameter D of the shaft may range from 0.0005 to 0.002. When the bearing clearance is reduced to be smaller, bearing rigidity may be increased but frictional loss may be increased to thereby increase power consumption. Meanwhile, if the bearing clearance is increased, frictional loss may be reduced but bearing rigidity cannot be secured. The diameter of the shaft and the numeral value range in the bearing clearance are described in U.S. Pat. No. 5,647,672.

Also, upper and lower radial dynamic pressure generating grooves 114 and 115 may be formed in upper and lower portions of at least one of an outer diameter of the shaft 111 and an inner diameter of the sleeve 112. When the shaft 111 rotates, the upper and lower radial dynamic pressure generating grooves 114 and 115 may generate fluid dynamic pressure in the radial direction to form a radial hydrodynamic bearing, thus smoothly supporting rotation of the rotor 120.

A plurality of upper and lower radial dynamic pressure generating grooves 114 and 115 are formed in the circumferential direction, and may have any shape among a herringbone shape, a spiral shape, and a helical shape. The upper and lower radial dynamic pressure generating grooves 114 and 115 may have any shape as long as they can generate radial dynamic pressure.

The sleeve 112 may have a circulation hole allowing upper and lower portions of the sleeve 112 to communicate with each other. The circulation hole may balance pressure generated from the upper and lower radial dynamic pressure generating grooves 114 and 115 and expel bubbles existing within the fluid dynamic pressure bearing assembly 110 through circulation.

Here, the stopper 111a may be formed in a lower edge portion of the shaft 111 and protruded to an outer side in a radial direction. The stopper 111a may be caught by a lower edge surface of the sleeve 112 to limit the rise of the shaft 111 and the rotor 120.

Also, a cover member 113 may be coupled to a lower portion of the sleeve 112 in the axial direction to cover the axial hole to prevent a leakage of oil (or lubricating fluid).

The hub 121 may be coupled to the shaft 111 and is a rotary member rotating cooperatively with the shaft 111. The hub 121 is a component constituting the fluid dynamic pressure bearing assembly 110 and also constituting the rotor 120, and hereinafter, the rotor 120 will be described in detail.

The rotor 120 is a rotary structure provided to be rotatable with respect to the stator 130. The rotor 120 may include the hub 121 having the annular magnet 127 provided on an inner circumferential surface thereof. The annular magnet 127 corresponds to the core 131 as described hereinafter at a certain interval therebetween.

In other words, the hub 121 is a rotary member coupled to an upper edge of the shaft 111 and rotating upon rotation of the shaft 111.

Here, the magnet 127 may be provided as a permanent magnet having an N pole and an S pole alternately magnetized in a circumferential direction to generate magnetic force having certain strength.

Also, the hub 121 may include a first cylindrical wall portion 122 fixed to an upper edge of the shaft 111, a disc plate portion 123 extending to an outer side in a radial direction from an end portion of the first cylindrical wall portion 122, and a second cylindrical wall portion 124 protruded downwardly from an outer edge portion of the disc plate portion 123 in the radial direction. The magnet 127 may be coupled to an inner circumferential surface of the second cylindrical wall portion 124. Also, the hub 121 may include a disc mounting portion 125 protruded to an outer side from a lower edge of the second cylindrical wall portion 124 in the radial direction.

Also, the hub 121 may include a main wall portion 126 formed to extend downwardly in the axial direction such that it corresponds to an upper outer portion of the sleeve 112. In detail, the main wall portion 126 may extend downwardly from the disc plate portion 123 in the axial direction. A liquid-vapor interface for sealing oil may be formed between an outer side of the sleeve 112 and an inner side of the main wall portion 126.

Also, an inner surface of the main wall portion 126 is tapered such that a space between the inner surface of the main wall portion 126 and an outer surface of the sleeve 112 is increased downwardly in the axial direction to facilitate oil sealing. Also, the outer surface of the sleeve 112 may be formed to be tapered.

In addition, an outer surface of the main wall portion 126 may be formed to correspond to an upper portion 136 of a mounting portion 134 protruded upwardly from the base member 133.

Meanwhile, thrust dynamic pressure generating grooves 116 may be formed in a portion in which the hub 121 and the sleeve 112 face each other. A plurality of the thrust dynamic pressure generating grooves 116 may be formed in a circumferential direction and may have a spiral, herringbone, or helical shape. The thrust dynamic pressure generating grooves 116 may have any shape as long as they can generate dynamic pressure.

When the shaft 111 rotates relatively with respect to the sleeve 112, the thrust dynamic pressure generating grooves 116 may generate a thrust fluid dynamic pressure to form a thrust hydrodynamic bearing between the hub 121 and the sleeve 112.

Meanwhile, in the related art, when the rotary member is sloped to one side, the rotary member may be returned to its original position by fluid dynamic pressure of the vertical radial bearing formed between the shaft and the sleeve. However, recently, as hard disc drives (HDDs) have tended to be thinner, a spindle motor installed therein is also fabricated to be thinner (an HDD having a standard of 5 mm or smaller).

Thus, in the thin spindle motor, a length of a shaft may be too short to secure a span of the vertical radial bearing. Thus, when the rotary member is sloped to one side, it may be difficult to form fluid dynamic pressure sufficient to return the sloped rotary member to its original position. In order to secure slope rigidity by the radial bearing, a bearing clearance may be reduced to strongly generate fluid dynamic pressure to increase bearing rigidity, but in this case, when the dynamic pressure is increased, frictional loss is increased, and eventually, power consumption is increased, which is, thus, undesirable.

Hence, the spindle motor according to an embodiment of the present invention has been devised to solve the problem of the weak slope rigidity of the radial bearing. Namely, rather than increasing the slope rigidity of the radial bearing itself, a structure in which the burden of the slope rigidity is transferred from the radial bearing to the thrust bearing to enable a sloped rotary member to be returned to its original position by fluid dynamic pressure formed between a thrust member and a sleeve is proposed. This will later be described.

Meanwhile, in an embodiment of the present invention, any member may be used as the thrust member as long as it is fixed to the shaft and generates thrust fluid dynamic pressure within the relatively rotating sleeve. For example, in the illustration of FIG. 1, the hub 121 coupled to the shaft 111 generates thrust fluid dynamic pressure in the sleeve 112, the hub 121 may be considered to be a thrust member. Namely, any component may be a thrust member according to a role thereof irrespective of its name.

The stator 130 may include the core 131, the coil 132, and the base member 133.

In other words, the stator 130 may be a fixed member including the coil 132 generating electromagnetic force having a certain magnitude when power is applied thereto and a plurality of cores 131 around which the coil 132 is wound.

The core 131 is fixedly disposed on an upper portion of the base member 133 having a pattern circuit-printed circuit board (PCB) (not shown), and a coil hole having a certain size may be formed in a penetrative manner in the base member 133 to expose the coil 132 downwardly. The coil 132 may be electrically connected to the PCB (not shown) such that external power is supplied thereto.

Also, the fluid dynamic pressure bearing assembly 110 may be mounted on the base member 133. The base member 133 may be made of aluminum (Al) and fabricated according to a die casting method or may also be fabricated by performing plastic working (e.g., pressing) on a steel sheet.

The base member 133 may have the mounting portion 134 formed to be protruded upwardly in the axial direction. The core 131 is installed on an outer surface of the mounting portion 134, and the sleeve 112 may be insertedly fixed to an inner surface of the mounting portion 134. Also, the upper portion 136 of the inner surface of the mounting portion 134 may be formed to face an outer surface of the main wall portion 126. A space between the main wall portion 126 and the upper portion 136 of the mounting portion 134 which face each other may be narrow enough to form a labyrinth seal.

Figure 2:
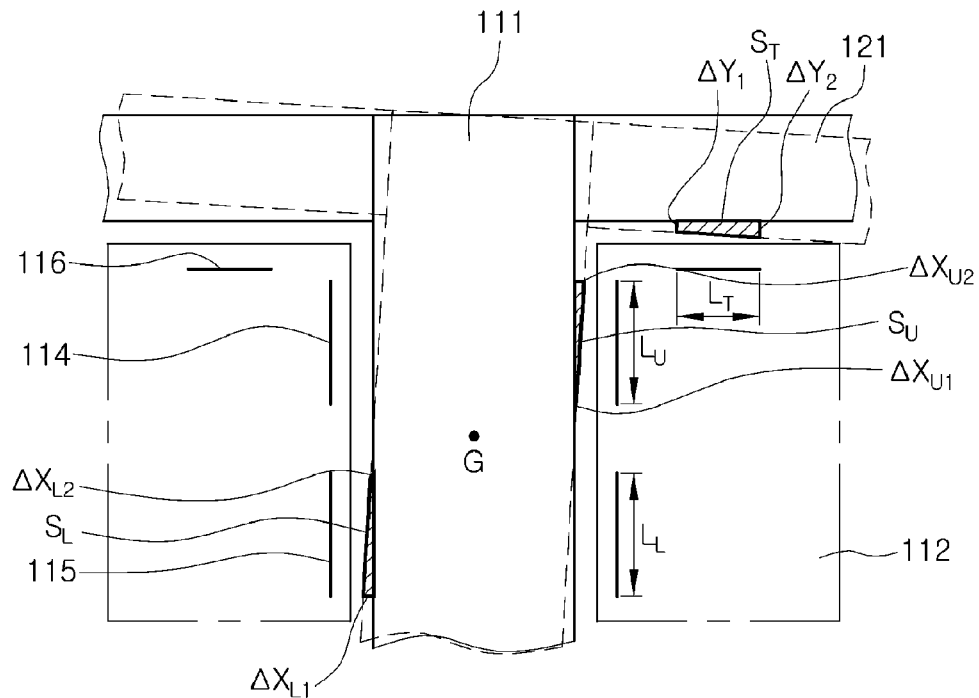
FIG. 2 is a view illustrating a mechanism for returning a rotary member sloped to one side to its original position in a spindle motor according to an embodiment of the present invention.
Figure 3:
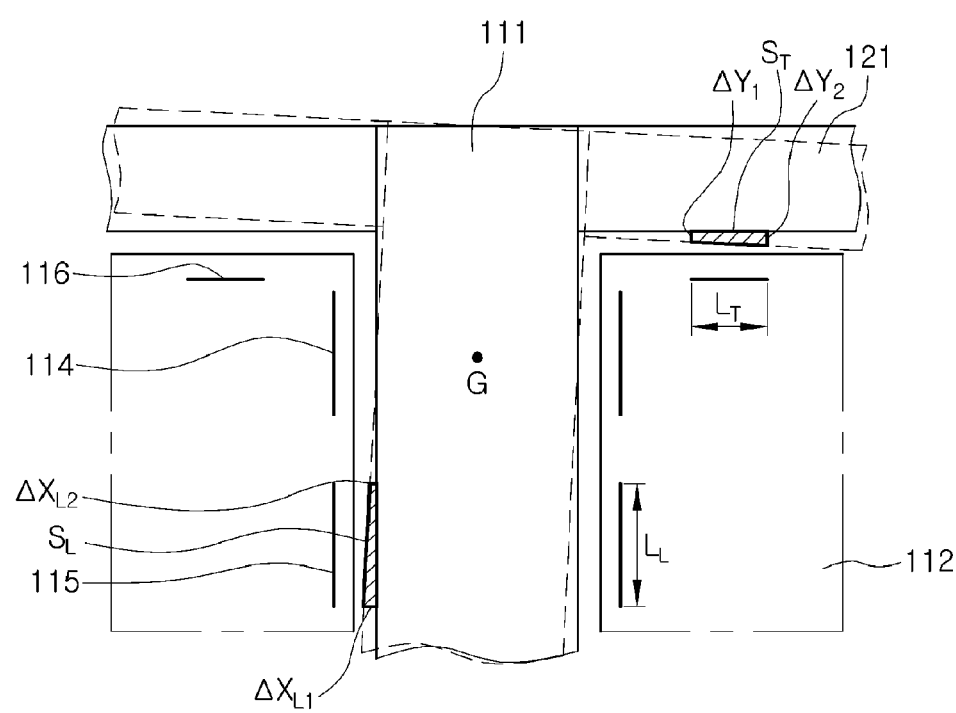
FIGS. 3 and 4 are views illustrating special cases of the mechanism of FIG. 2.
Figure 4:
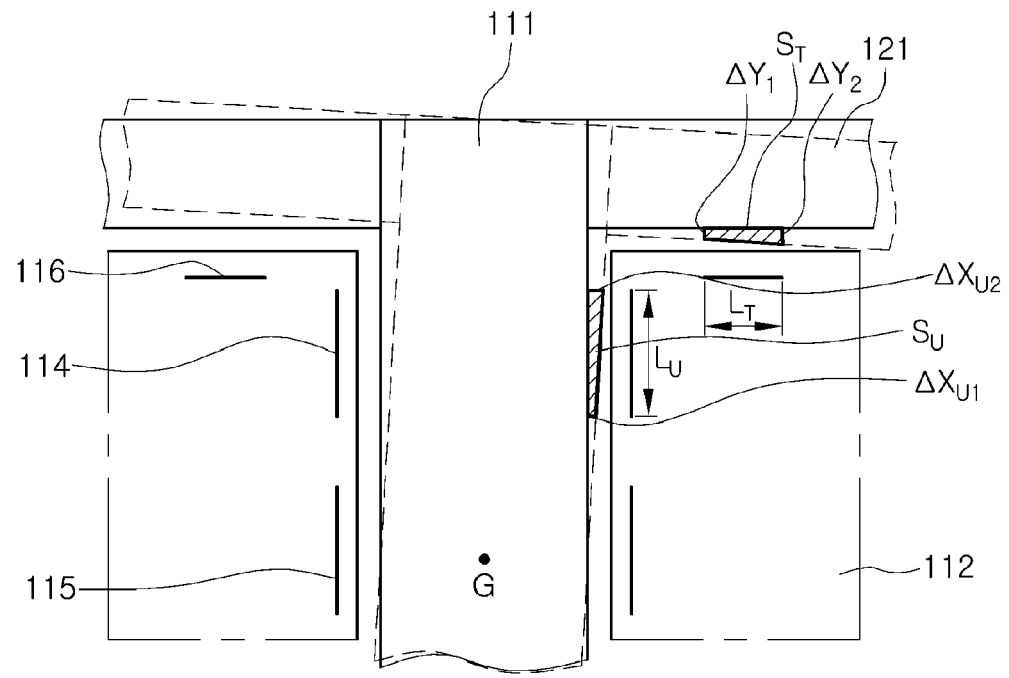
Figure 5:
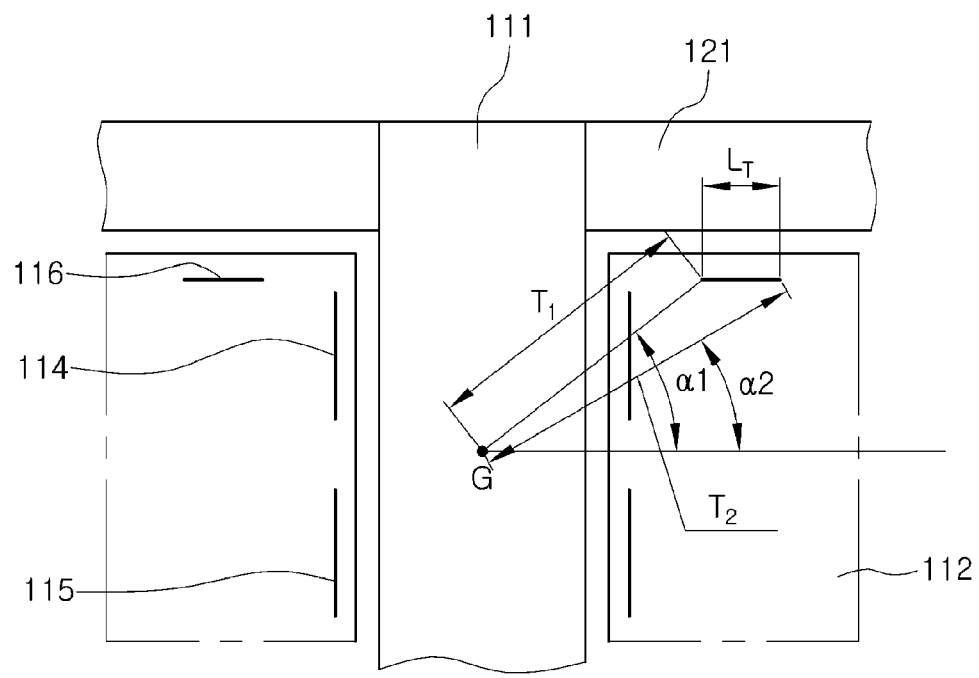
FIG. 5 is a view illustrating definitions of various parameters for mathematically calculating (or estimating) the mechanism of FIG. 2.
Figure 6:
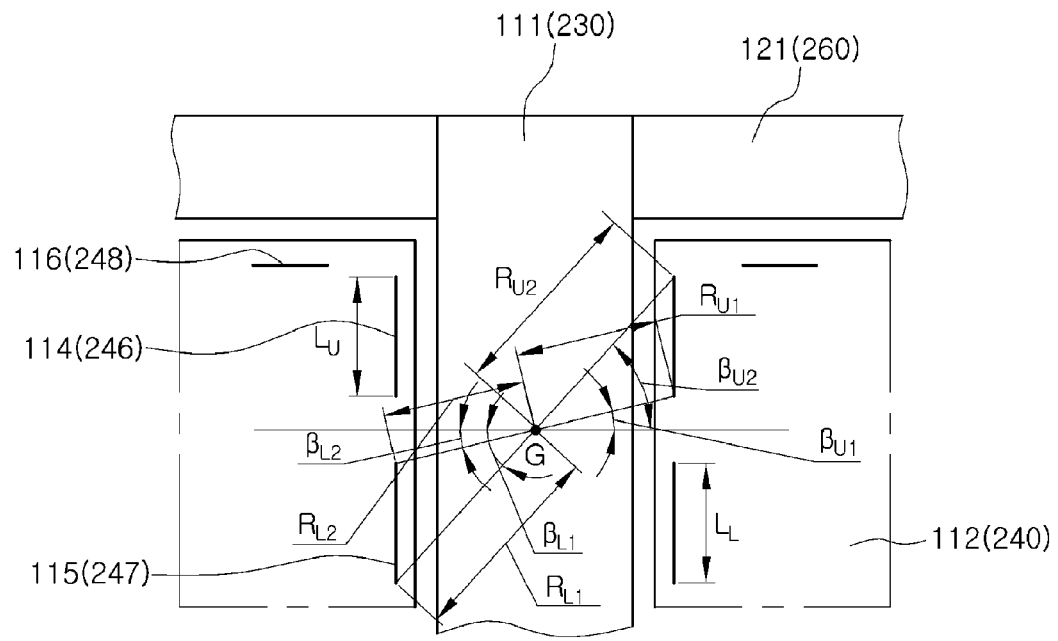
FIG. 6 is a view illustrating definitions of various parameters for mathematically calculating (or estimating) the mechanisms of FIGS. 2 and 10.
Figure 7:
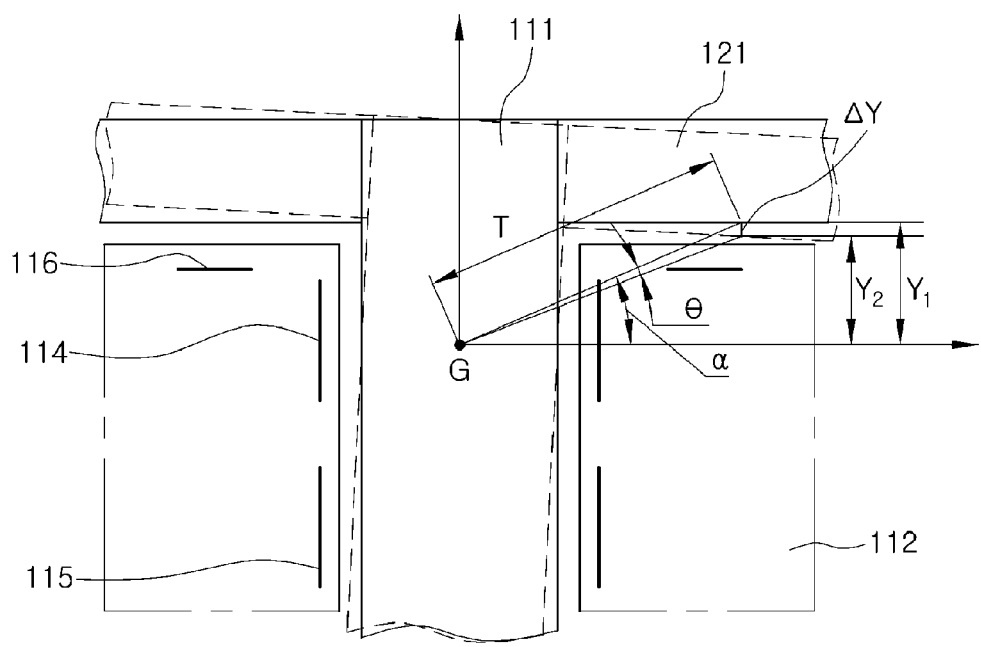
FIGS. 7 and 8 are views illustrating a method for mathematically calculating (or estimating) the mechanism of FIG. 2.
Figure 8:
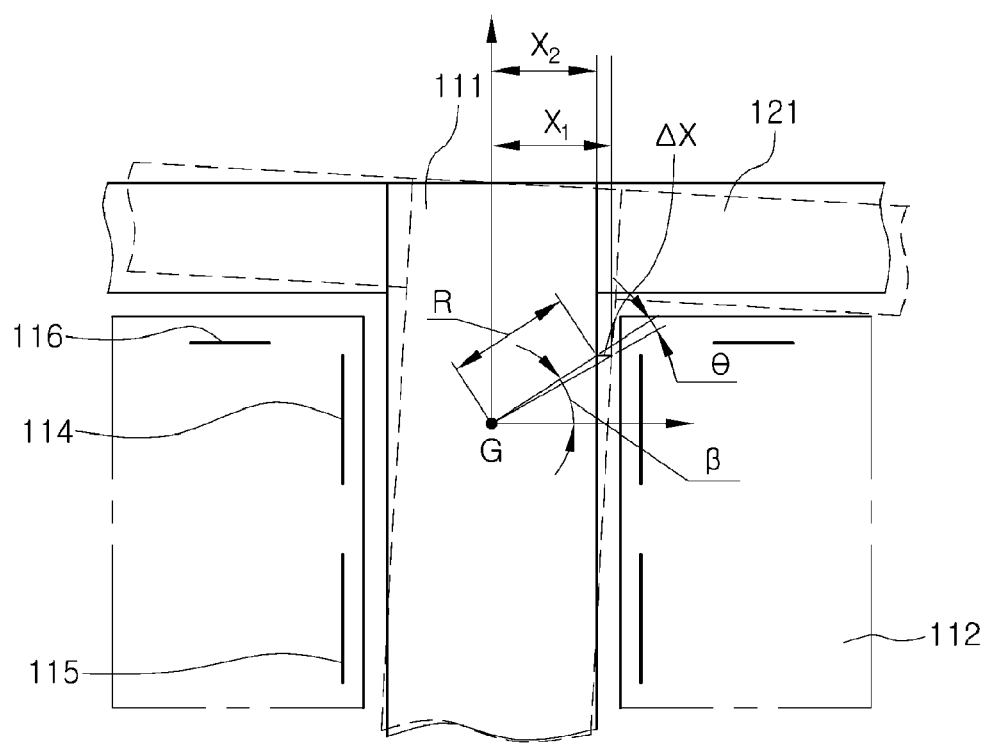

FIG. 2 is a view illustrating a mechanism for returning a rotary member sloped to one side to its original position in a spindle motor according to an embodiment of the present invention. FIGS. 3 and 4 are views illustrating special cases of the mechanism of FIG. 2. FIG. 5 is a view illustrating definitions of various parameters for mathematically calculating (or estimating) the mechanism of FIG. 2. FIG. 6 is a view illustrating definitions of various parameters for mathematically calculating (or estimating) the mechanisms of FIGS. 2 and 10. FIGS. 7 and 8 are views illustrating a method for mathematically calculating (or estimating) the mechanism of FIG. 2.

Referring to FIG. 2, in the spindle motor 100 according to an embodiment of the present invention, when the rotary member rotates relatively with respect to the fixed member, the rotary member may be sloped to one side due to external impact or any other force. Namely, the shaft 111, rotatably installed in the sleeve 112, may be sloped to one side. When the shaft 111 is sloped, the hub 121 mounted on the shaft 111 is also sloped to one side together.

When the shaft 111 is positioned, without being sloped, in the sleeve 112, a bearing clearance formed by the shaft 111 and the sleeve 112 and that formed by the sleeve 112 and the hub 121 maintain a uniform gap. Thus, uniform fluid dynamic pressure is formed between the shaft 111 and the sleeve 112 and between the sleeve 112 and the hub 121, making a balanced state in which the rotary member rotates relatively with respect to the fixed member.

However, when the rotary member is sloped, a uniform gap cannot be maintained in the bearing clearance.

Namely, as illustrated in FIG. 2, in the case of the solid line in which the rotary members (i.e., the shaft 111 and the hub 121) are not sloped, a uniform gap is maintained in the bearing clearance between the rotary members and the sleeve 112, while in the case of the dotted line in which the rotary members (i.e., the shaft 111 and the hub 121) are sloped, the size of bearing clearance between the rotary members and the sleeve 112 varies according to positions thereof.

In this case, in case of the related art spindle motor extending in the axial direction (e.g., a motor used in an HDD having a thickness standard of 9.5 mm or 15 mm), the rotary members have no difficulty in being returned to their original positions by the fluid dynamic pressure of the vertical radial bearing formed between the shaft and the sleeve. However, in the case of a spindle motor relatively short in the axial direction (e.g., a motor used in an HDD having a thickness standard of 5 mm or smaller), it is difficult for the rotary members to be returned to their original positions by the fluid dynamic pressure of the vertical radial bearing formed between the shaft and the sleeve.

Thus, referring to FIG. 2, when the shaft 111 is sloped to one side, the bearing clearance is reduced in portions (i.e., portions $S_T$, $S_U$, and $S_L$, in FIG. 2) in which the dynamic pressure generating grooves are formed, and in this case, in the portions which the dynamic pressure generating grooves are formed, fluid dynamic pressure between the members may be increased as much as the bearing clearance is reduced. Namely, in the portions in which the dynamic pressure generating grooves are formed, fluid dynamic pressure may be formed to be greater in proportion to the area reduced as the gap between the facing members is closer. Thus, in an embodiment of the present invention, a relationship between positions and sizes of the thrust dynamic pressure generating grooves 116 and the radial dynamic pressure generating grooves 114 and 115 may be established mathematically by using such a principle.

When the rotating member (i.e., the shaft 111 in FIG. 2) is sloped to one side, fluid dynamic pressure for returning the rotating member to a side opposite to the one side may be recognized as fluid dynamic pressure additionally generated as the rotating member is sloped to one side. Namely, it may be a difference between closer gaps of the members facing each other in the portions in which the dynamic pressure generating grooves are formed. It may be areas $S_T$, $S_U$, and $S_L$ of the portions in which the space is different before and after the shaft 111 and the hub 121 are sloped.

Namely, the area $S_T$ according to the difference between the gaps before and after the hub 121 is sloped in the portion in which the thrust dynamic pressure generating grooves 116 is formed, may be greater than the area ($S_U+S_L$) according to a difference between the gaps before and after the shaft 111 is sloped in the portion in which the radial dynamic pressure generating grooves 114 and 115 are formed. As a result Formula 1 shown below may be established.

$$S_T > S_U + S_L$$ [Formula 1]

By designing such that the above equation is satisfied, a thrust bearing burdens more slope rigidity than the radial bearing.

Namely, in the thin structure, the slope rigidity of the radial bearing is weakened but the slope rigidity by the thrust bearing is enhanced, and thus, when the rotary member is sloped, the thrust bearing resists the sloping, thus preventing tilting.

Meanwhile, in the case of a double thrust structure in which thrust members are formed in upper and lower portions, the area $S_T$ according to a difference between the gaps before and after the thrust member is sloped in the portion in which the thrust dynamic pressure generating grooves are formed may be the sum of areas according to the difference between the gaps before and after the upper and lower thrust members are sloped in the portion in which the thrust dynamic pressure generating grooves are formed.

Meanwhile, in an embodiment of the present invention, any member may be used as the thrust member as long as it is fixed to the shaft and generates thrust fluid dynamic pressure within the relatively rotating sleeve. For example, in the illustration of FIG. 1, the hub 121 coupled to the shaft 111 generates thrust fluid dynamic pressure in the sleeve 112, the hub 121 may be considered to be a thrust member. Namely, any component may be a thrust member according to a role thereof irrespective of its name.

Referring to FIGS. 5 to 8, parameters and mathematical calculation methods for solving and organizing Equation 1 above are proposed.

Respective parameters may be defined with reference to FIGS. 5 and 6 as follows.

$T_1$ is a distance from the center of gravity of the rotary member to an inner edge of the thrust dynamic pressure generating grooves, $T_2$ is a distance from the center of gravity of the rotary member to an outer edge of the thrust dynamic pressure generating grooves, $\alpha_1$ is a smaller angle among angles formed between a line extended through the center of gravity of the rotary member in the radial direction and a line connecting the center of gravity of the rotary member and the inner edge of the thrust dynamic pressure generating grooves, $\alpha_2$ is a smaller angle among angles formed between a line extended through the center of gravity of the rotary member in the radial direction and a line connecting the center of gravity of the rotary member and the outer edge of the thrust dynamic pressure generating grooves, $L_T$ is a length of the thrust dynamic pressure generating grooves in the radial direction, $R_{U1}$ is a distance from the center of gravity of the rotary member to a lower edge of the upper radial dynamic pressure generating grooves, $R_{U2}$ is a distance from the center of gravity of the rotary member to an upper edge of the upper radial dynamic pressure generating grooves, $\beta_{U1}$ is a smaller angle among angles formed between a line extended through the center of gravity of the rotary member in the radial direction and a line connecting the center of gravity of the rotary member and the lower edge of the upper radial dynamic pressure generating grooves, $\beta_{U2}$ is a smaller angle among angles formed between a line extended through the center of gravity of the rotary member in the radial direction and a line connecting the center of gravity of the rotary member and the upper edge of the upper radial dynamic pressure generating grooves, $L_U$ is a length of the upper radial dynamic pressure generating grooves in the axial direction, $R_{L1}$ is a distance from the center of gravity of the rotary member to the lower edge of the lower radial dynamic pressure generating grooves, $R_{L2}$ is a distance from the center of gravity of the rotary member to the upper edge of the lower radial dynamic pressure generating grooves, $\beta_{L1}$ is a smaller angle among angles formed between a line extended through the center of gravity of the rotary member in the radial direction and a line connecting the center of gravity of the rotary member and the lower edge of the lower radial dynamic pressure generating grooves, $\beta_{L2}$ is a smaller angle among angles formed between a line extended through the center of gravity of the rotary member in the radial direction and a line connecting the center of gravity of the rotary member and the upper edge of the lower radial dynamic pressure generating grooves, and $L_L$ is a length of the lower radial dynamic pressure generating grooves in the axial direction.

Also, in an embodiment of the present invention, the center of gravity G of the rotary member refers to a final state in which a disc, a clamp, and the like, are installed in the spindle motor. The spindle motor 100 illustrated in FIG. 1 is in a state in which a disc, a clamp, and the like, are not installed, and the center of gravity G illustrated in FIGS. 2 through 8 refers to the center of gravity of the rotary member with a disc, a clamp, and the like, installed therein.

Next, a method for calculating variations in a size of a bearing clearance, i.e., a variation $\Delta Y$ in the bearing clearance in a portion in which a thrust fluid dynamic pressure is formed and a variation $\Delta X$ in the bearing clearance in a portion in which a radial fluid dynamic pressure is formed, when the rotary member is sloped to one side will be described with reference to FIGS. 7 and 8.

The variation $\Delta Y$ in the bearing clearance of the portion in which the thrust fluid dynamic pressure is formed refers to a difference between a position of the rotary member in the axial direction in which the rotary member faces one edge of the thrust dynamic pressure generating grooves 116 before being sloped, and a position of the rotary member in the axial direction in which the rotary member faces one edge of the thrust dynamic pressure generating grooves 116 after being sloped. Thus, in the illustration of FIG. 7, $\Delta Y$ may be calculated to be $Y_1-Y_2$ (i.e., $\Delta Y=Y_1-Y_2$) When $\Delta Y$ is organized in detail, it may be calculated as expressed by Formula 2 shown below.

[Formula 2]

$$\begin{aligned}\Delta Y &= T\sin\alpha - T\cos\alpha\tan(\alpha - \theta) \\ &= T\sin\alpha - T\cos\alpha\sin(\alpha - \theta)/\cos(\alpha - \theta) \\ &= T\sin\alpha - T\sin(\alpha - \theta) \\ &= T(\sin\alpha - \sin(\alpha - \theta)) \\ &= T(\sin\alpha - \sin\alpha\cos\theta + \cos\alpha\sin\theta) \\ &= T(\sin\alpha - \sin\alpha + \theta\cos\alpha) \\ &= T\theta\cos\alpha\end{aligned}$$

Here, T is a distance from the center of gravity of the rotary member to one edge of the thrust dynamic pressure generating grooves (specifically, T is a distance from the center of gravity of the rotary member to a point of the rotary member facing the one edge of the thrust dynamic pressure generating grooves, but the values are substantially the same), $\alpha$ is a smaller angle among angles formed between a line extended through the center of gravity of the rotary member in the radial direction and a line connecting the center of gravity of the rotary member and one edge of the thrust dynamic pressure generating grooves (specifically, $\alpha$ is an angle formed between the line extended through the center of gravity of the rotary member and a line connecting the center of gravity of the rotary member and a point of the rotary member facing the one edge of the thrust dynamic pressure generating grooves, but the values are substantially the same), and $\theta$ is a slope angle of the rotary member (here, since $\theta$ is a small angle, it may be assumed that $\sin\theta=\theta$ and $\cos\theta=1$).

The variation $\Delta X$ in the bearing clearance of the portion in which the radial fluid dynamic pressure is formed may be calculated by Equation 3 shown below.

The variation $\Delta X$ in the bearing clearance of the portion in which the radial fluid dynamic pressure is formed refers to a difference between a position of the rotary member facing one edge of the radial dynamic pressure generating groove 114 in the radial direction before being sloped and a position of the rotary member facing one edge of the radial dynamic pressure generating groove 114 in the radial direction after being sloped. Thus, $\Delta X$ may be calculated to be $X_1-X_2$ (i.e., $\Delta X = X_1 - X_2$) in the illustration of FIG. 6. When $\Delta X$ is organized in detail, it may be calculated as expressed by Formula 3 shown below.

[Formula 3]

$$\begin{aligned} \Delta X &= R\cos(\pi/2-\beta)\tan(\pi/2-\beta+\theta) - R\sin(\pi/2-\beta) \\ &= R\sin(\pi/2-\beta+\theta) - R2\sin(\pi/2-\beta) \\ &= R\cos(\beta-\theta) - R2\cos\beta \\ &= R(\cos(\beta-\theta) - \cos\beta) \\ &= R(\cos\beta\cos\theta + \sin\beta\sin\theta - \cos\beta) \\ &= R\theta\sin\beta \end{aligned}$$

Here, R is a distance from the center of gravity of the rotary member to one edge of the radial dynamic pressure generating groove (specifically, R is a distance from the center of gravity of the rotary member to a point of the rotary member facing one edge of the radial dynamic pressure generating groove, but the values are substantially the same), $\beta$ is a smaller angle among angles formed between a line extended through the center of gravity of the rotary member in the radial direction and a line connecting the center of gravity of the rotary member and one edge of the radial dynamic pressure generating groove (specifically, $\beta$ is an angle formed between the line extended through the center of gravity of the rotary member and a line connecting the center of gravity of the rotary member and a point of the rotary member facing one edge of the radial dynamic pressure generating groove, but the values are substantially the same), and $\theta$ is a slope angle of the rotary member (here, since $\theta$ is a small angle, it may be assumed that $\sin\theta=\theta$ and $\cos\theta=1$).

Referring back to FIG. 2, in order to calculate Formula 1, the area of respective terms may be calculated.

The area $S_T$ according to the difference between the gaps in the portion in which the thrust dynamic pressure generating grooves 116 is formed before and after the hub 121 is sloped may be calculated by a formula for obtaining the width of a trapezoid, so it can be calculated by Formula 4 shown below.

[Formula 4]

$$\begin{aligned} S_T &= 0.5(\Delta Y_1 + \Delta Y_2)L_T \\ &= 0.5\theta(T_1\cos\alpha_1 + T_2\cos\alpha_2)L_T \end{aligned}$$

Here, $\Delta Y_1$ is a variation in the bearing clearance in the portion in which the inner edge of the thrust dynamic pressure generating grooves is positioned, $\Delta Y_2$ is a variation in the bearing clearance in the portion in which the outer edge of the thrust dynamic pressure generating grooves is positioned, and the other parameters refer to the descriptions with reference to FIGS. 5 through 8.

Next, area $S_U$ according to the difference between the gaps in the portion in which the upper radial dynamic pressure generating grooves 114 is formed before and after the shaft 111 is sloped may be calculated by a formula for obtaining the width of a trapezoid, so it can be calculated by Formula 5 shown below.

[Formula 5]

$$\begin{aligned} S_U &= 0.5(\Delta X_{U1} + \Delta X_{U2})L_U \\ &= 0.5\theta(R_{U1}\sin\beta_{U1} + R_{U2}\sin\beta_{U2})L_U \end{aligned}$$

Here, $\Delta X_{U1}$ is a variation in the bearing clearance in the portion in which the lower edge of the upper radial dynamic pressure generating grooves is positioned, $\Delta X_{U2}$ is a variation in the bearing clearance in the portion in which the upper edge of the upper radial dynamic pressure generating grooves is positioned, and the other parameters refer to the descriptions with reference to FIGS. 5 through 8.

Also, area $S_L$ according to the difference between the gaps in the portion in which the lower radial dynamic pressure generating grooves 115 is formed before and after the shaft 111 is sloped may be calculated by a formula for obtaining the width of a trapezoid, so it can be calculated by Formula 6 shown below.

[Formula 6]

$$\begin{aligned} S_L &= 0.5(\Delta X_{L1} + \Delta X_{L2})L_L \\ &= 0.5\theta(R_{L1}\sin\beta_{L1} + R_{L2}\sin\beta_{L2})L_L \end{aligned}$$

Here, $\Delta X_{L1}$ is a variation in the bearing clearance in the portion in which the lower edge of the lower radial dynamic pressure generating grooves is positioned, $\Delta X_{L2}$ is a variation in the bearing clearance in the portion in which the upper edge of the lower radial dynamic pressure generating grooves is positioned, and the other parameters refer to the descriptions with reference to FIGS. 5 through 8.

Thus, when Formula 4 to Formula 6 are substituted to Formula 1, Formula 7 is obtained, and Formula 8 is derived from Formula 7.

$0.5\theta(T_1\cos\alpha_1 + T_2\cos\alpha_2)L_T > 0.5\theta(R_{U1}\sin\beta_{U1} + R_{U2}\sin\beta_{U2})L_U + 0.5\theta(R_{L1}\sin\beta_{L1} + R_{L2}\sin\beta_{L2})L_L$  [Formula 7]

$(T_1\cos\alpha_1 + T_2\cos\alpha_2)L_T > (R_{U1}\sin\beta_{U1} + R_{U2}\sin\beta_{U2})L_U + (R_{L1}\sin\beta_{L1} + R_{L2}\sin\beta_{L2})L_L$  [Formula 8]

Thus, when the thrust dynamic pressure generating grooves and the radial dynamic pressure generating groove establish the relationship of Formula 8, the thrust bearing, rather than the radial bearing, resists sloping, thus preventing tilting.

Meanwhile, the center of gravity of the rotary member may come at various positions according to the structure and shape of the rotary member. In particular, in case of the spindle motor according to an embodiment of the present invention, when the center of gravity of the rotary member is formed within the upper radial dynamic pressure generating grooves or the lower radial dynamic pressure generating grooves region, the relationship between the thrust dynamic pressure generating grooves and the radial dynamic pressure generating groove can be simply established.

Referring to FIG. 3, the center of gravity G of the rotary member may be positioned in the upper dynamic pressure generating groove region and an upper region thereof. Also, in this case, the thrust dynamic pressure generating grooves and the radial dynamic pressure generating groove should satisfy the relationship of Formula 1.

In this case, when the center of gravity G of the rotary member is positioned in the upper radial dynamic pressure generating grooves region and an upper region thereof, the area $S_U$ according to the difference between the gaps in the portion in which the upper radial dynamic pressure generating grooves 114 is formed before and after the shaft 111 is sloped, among the terms of Formula 1, has a value as small as negligible. Thus, Formula 1 may be simplified into Formula 10 shown below.

$$S_T > S_L \quad \text{[Formula 10]}$$

Thus, when Formula 4 and Formula 6 are substituted to Formula 10, Formula 11 can be obtained, and Formula 12 may be derived from Formula 11.

$$0.5\theta(T_1 \cos \alpha_1 + T_2 \cos \alpha_2) L_T > 0.5\theta(R_{L1} \sin \beta_{L1} + R_{L2} \sin \beta_{L2}) L_L \quad \text{[Formula 11]}$$

$$(T_1 \cos \alpha_1 + T_2 \cos \alpha_2) L_T > (R_{L1} \sin \beta_{L1} + R_{L2} \sin \beta_{L2}) L_L \quad \text{[Formula 12]}$$

Also, referring to FIG. 4, the center of gravity of the rotary member may be positioned in the lower radial dynamic pressure generating grooves region and a lower region thereof. Also, in this case, the thrust dynamic pressure generating grooves and the radial dynamic pressure generating groove should satisfy the relationship of Formula 1.

In this case, when the center of gravity G of the rotary member is positioned in the lower radial dynamic pressure generating grooves region and a lower region thereof, the area $S_L$ according to the difference between the gaps in the portion in which the lower radial dynamic pressure generating grooves 115 is formed before and after the shaft 111 is sloped, among the terms of Formula 1, has a value as small as negligible. Thus, Formula 1 may be simplified into Formula 13 shown below.

$$S_T > S_U \quad \text{[Formula 13]}$$

Thus, when Formula 4 and Formula 6 are substituted to Formula 13, Formula 14 can be obtained, and Formula 15 may be derived from Formula 14.

$$0.5\theta(T_1 \cos \alpha_1 + T_2 \cos \alpha_2) L_T > 0.5\theta(R_{U1} \sin \beta_{U1} + R_{U2} \sin \beta_{U2}) L_U \quad \text{[Formula 14]}$$

$$(T_1 \cos \alpha_1 + T_2 \cos \alpha_2) L_T > (R_{U1} \sin \beta_{U1} + R_{U2} \sin \beta_{U2}) L_U \quad \text{[Formula 15]}$$

Thus, when the center of gravity G of the rotary member is positioned within the region of the radial dynamic pressure generating groove, the thrust dynamic pressure generating grooves and the radial dynamic pressure generating groove may only need to satisfy the simplified Formula 12 or Formula 15.

In the embodiment of FIGS. 1 through 8, the shaft-rotation type structure in which the hub is rotatably coupled to the shaft has been described, but, of course, the present invention may be applicable to a shaft-fixed type structure in which the hub is rotatably coupled to the sleeve.

Figure 9:
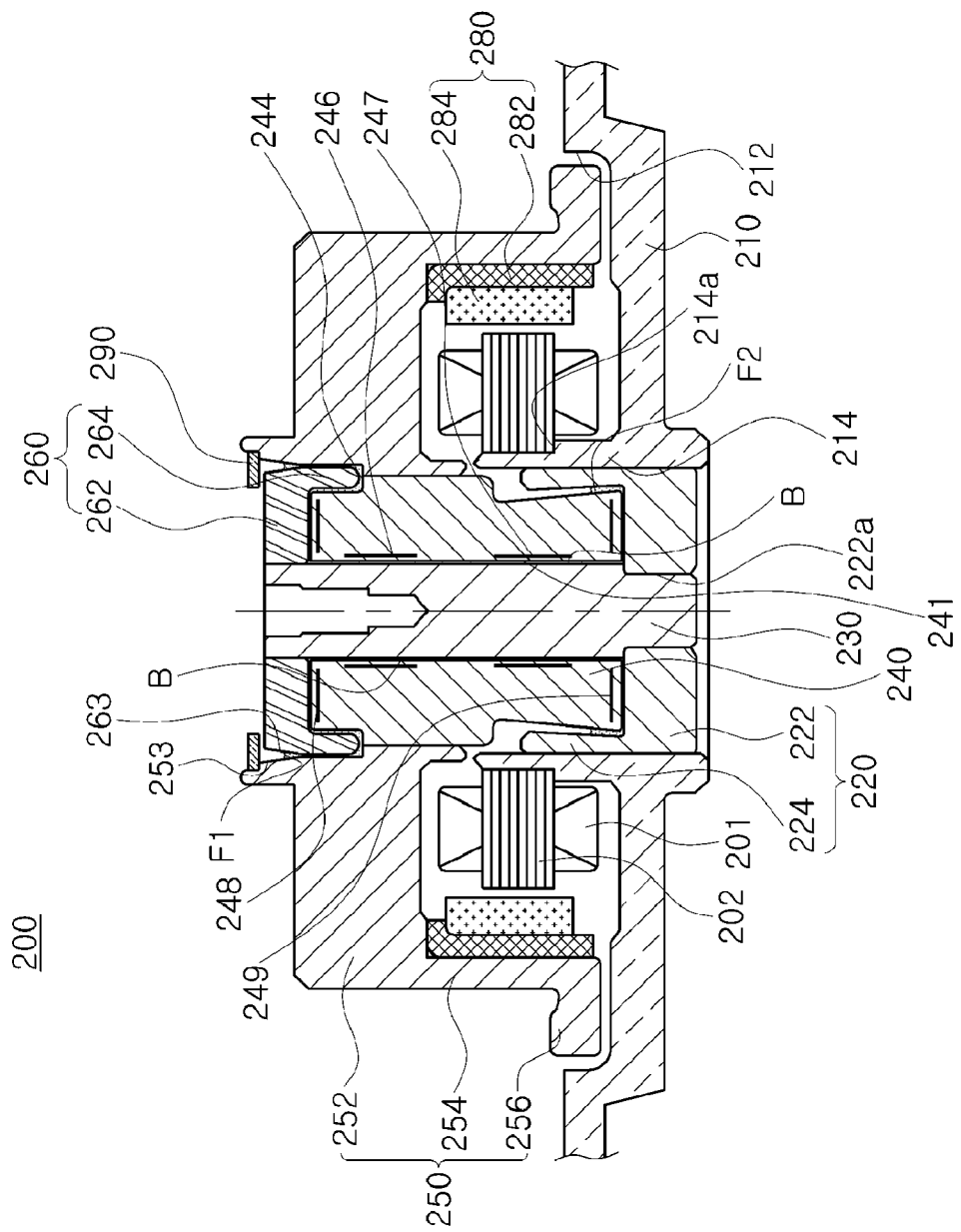
FIG. 9 is a schematic cross-sectional view of a spindle motor according to another embodiment of the present invention.
Figure 10:
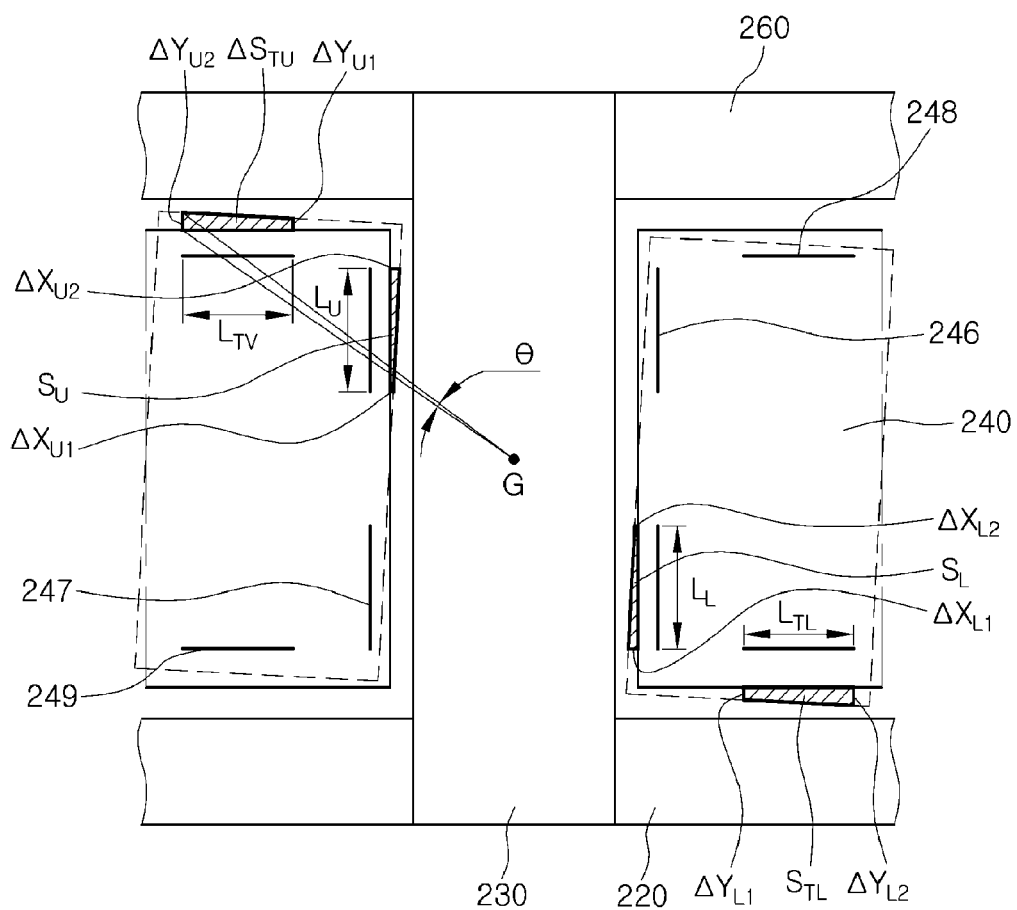
FIG. 10 is a view illustrating definitions of various parameters for applying the mechanism of FIG. 2 to the spindle motor of FIG. 9 according to an embodiment of the present invention.

FIG. 9 is a schematic cross-sectional view of a spindle motor according to another embodiment of the present invention. FIG. 10 is a view illustrating definitions of various parameters for applying the mechanism of FIG. 2 to the spindle motor of FIG. 9 according to an embodiment of the present invention.

Referring to FIG. 9, a spindle motor 200 according to another embodiment of the present invention may include a base member 210, a lower thrust member 220, a shaft 230, a sleeve 240, a hub 250, an upper thrust member, and a cap member 290.

First, referring to definitions of terms of directions, an axial direction may refer to a vertical direction, namely, a direction from a lower side of the shaft 230 to an upper side of the shaft 230 or from the upper side of the shaft 230 to the lower side of the shaft 230, when viewed in FIG. 9, a radial direction may refer to a horizontal direction, namely, a direction from the shaft 230 to an outer circumferential surface of the hub 250 or from the outer circumferential surface of the hub 250 to the shaft 230 when viewed in FIG. 9, and a circumferential direction may refer to a rotational direction along a certain radius from the center of rotation. The circumferential direction is a rotational direction along an outer circumferential surface of the hub 150.

In the spindle motor 200 according to an embodiment of the present invention, a rotary member is smoothly rotated relatively with respect to a fixed member by using a fluid dynamic pressure bearing assembly.

Here, the fluid dynamic pressure bearing assembly may be comprised of members relatively rotated by generating fluid dynamic pressure by the medium of a lubricating fluid, and include the lower thrust member 220, the sleeve 240, the shaft 230, the upper thrust member 260, and the hub 250.

Also, the rotary member may include the sleeve 240 and the hub 250 as members relatively rotated with respect to the fixed member, and may also include a magnet 284 provided in the hub 250.

Also, the fixed member, a member fixed, relative to the rotary member, may include the base member 210, the shaft 230, the lower thrust member 240, and the upper thrust member 260.

The base member 210 may include a mounting recess 212 forming a certain space together with the hub 250. The base member 210 may include a coupling portion 214 formed to extend upwardly in the axial direction. A stator core 202 may be installed on an outer circumferential surface of the coupling portion 214.

A mounting surface 214a may be provided on the outer circumferential surface of the coupling portion 214 to allow the stator core 202 to be mounted thereon. The stator core 202 mounted on the coupling portion 214 may be disposed in an upper portion of the mounting recess 212 of the base member 210.

Meanwhile, the base member 210 may be fabricated by performing plastic-working on a rolled steel sheet. In detail, the base member 210 may be fabricated through pressing, stamping, deep drawing, or the like. However, the fabrication of the base member 210 is not limited thereto and the base member 210 may also be fabricated through various other methods such as aluminum die-casting, and the like.

Meanwhile, since the base member 210 is fabricated by performing plastic-working on a rolled steel sheet, the base member 210 can be fabricated to be thin and uniform. Thus, it may not be easy to integrally form the coupling portion 214 provided on the base member 210. Thus, in the case of the base member 210 according to an embodiment of the present invention, the coupling portion 214 may be formed as a separate member and coupled to base member 210 when the spindle motor is assembled.

The lower thrust member 220 is fixedly installed on the base member 210. Namely, the lower thrust member 220 is insertedly installed on the coupling portion 214, and in detail, the lower thrust member 220 may be installed such that an outer circumferential surface thereof is joined to an inner circumferential surface of the coupling portion 214.

Meanwhile, the lower thrust member 220 may include a disc portion 222 having an inner surface fixedly installed on the shaft 230 and an outer surface fixedly installed on the base member 210 and an extending portion 224 formed to extend upwardly in the axial direction from the disc portion 222.

Namely, the lower thrust member 220 may have a cup-like shape with a hollow. Namely, the lower thrust member 220 may be formed such that a section thereof has a channel-like shape.

Also, the disc portion 222 may have an installation hole 222a for an installation of the shaft 230, and the shaft 230 is insertedly installed in the installation hole 222a.

The lower thrust member 220 is included in a fixed member, i.e., a stator, along with the base member 210.

Meanwhile, an outer surface of the lower thrust member 220 may be joined to an inner surface of the base member 210 through an adhesive and/or welding. In other words, the outer surface of the lower thrust member 220 is fixedly joined to the inner surface of the coupling portion 214 of the base member 210.

Also, lower thrust dynamic pressure generating grooves 249 for generating fluid dynamic pressure may be formed in at least one of an upper surface of the lower thrust member 220 or a lower surface 240b of the sleeve 240. In the illustration of the FIG. 9, the lower thrust dynamic pressure generating grooves 249 is formed in the lower surface of the sleeve 240, but the present invention is not limited thereto and the lower thrust dynamic pressure generating grooves 249 may also be provided on the lower thrust member 220 facing the lower surface of the sleeve 240.

In addition, the lower thrust member 220 may also serve as a sealing member for preventing a leakage of a lubricating fluid.

The shaft 230 is fixedly installed on at least one of the lower thrust member 220 and the base member 210. Namely, the shaft 230 may be installed such that a lower edge portion thereof is inserted into the installation hole 222a formed on the disc portion 222 of the lower thrust member 220.

Also, the lower edge portion of the shaft 230 may be joined to an inner surface of the disc portion 222 through an adhesive or/and welding. Thus, the shaft 230 may be fixed.

Here, in an embodiment of the present invention, the case in which the shaft 230 is fixedly installed on the lower thrust member 220 is described as an example, but the present invention is not limited thereto and the shaft 230 may be fixedly installed on the base member 210.

Meanwhile, the shaft 230 is also a component included in a fixed member, i.e., the stator, along with the lower thrust member 220 and the base member 210.

A coupling unit, e.g., a screw unit, to which a screw is fastened, may be provided in an upper surface of the shaft 230 in order to fixedly install a cover member (not shown).

The sleeve 240 may be rotatably installed on the shaft 230. To this end, the sleeve 240 may have a through hole 241 allowing the shaft 230 to be inserted therethrough. Meanwhile, when the sleeve 240 is installed on the shaft 230, an inner circumferential surface of the sleeve 240 and an outer circumferential surface of the shaft 230 are spaced apart by a certain interval to form a bearing clearance B. The bearing clearance B is filled with a lubricating fluid.

Meanwhile, a step surface 244 may be formed on an upper edge portion of the sleeve 240 in order to form a sealing portion having a labyrinth shape between the upper edge portion of the sleeve 240 and the upper thrust member 260. The lubricating fluid may be firmly sealed by the sealing portion having a labyrinth shape formed by the step surface 244 and the upper thrust member 260.

Meanwhile, an outer surface of an upper edge portion of the upper thrust member 260 may have a sloped portion 263 to form a first liquid-vapor interface F1 with the hub 250. The sloped portion 263 may be formed such that an outer diameter of an upper portion thereof is greater than an outer diameter of a lower portion thereof.

In other words, the sloped portion 263, of which an outer diameter of an upper portion is greater than that of a lower portion thereof, may be formed on an upper edge portion of the upper thrust member 260 such that the first liquid-vapor interface F1 is formed in a space between an outer circumferential surface of the upper thrust member 260 and an inner circumferential surface of the hub 250.

Also, the hub 250 is joined to an outer circumferential surface of the sleeve 240. Namely, a lower portion of the step surface 244 may have a shape corresponding to an inner surface of the hub 250 such that the hub 250 may be fixedly installed. Namely, an outer circumferential surface of the sleeve 240 may have a junction surface.

Here, the sleeve 240 and the hub 250 may be integrally formed. When the sleeve 240 and the hub 250 are integrally formed, since the sleeve 240 and the hub 250 are provided as a single member, the number of components can be reduced, and thus, assembly of the product can be facilitated and assembly tolerance can be minimized.

Meanwhile, a lower edge portion of the outer circumferential surface of the sleeve 240 may be formed to be sloped upwardly toward an inner side in the radial direction to form a liquid-vapor interface with the extending portion 224 of the lower thrust member 220.

Namely, in order to form a second liquid-vapor interface F2 in a space between the outer circumferential surface of the sleeve 240 and the extending portion 224 of the lower thrust member 220, the lower edge portion of the sleeve 240 may be formed to be upwardly sloped toward an inner side in the radial direction. Namely, a sealing portion of a lubricating fluid may be formed in a space between the outer circumferential surface of the sleeve 240 and the extending portion 224 of the lower thrust member 220.

In this manner, since the second liquid-vapor interface F2 is formed in the space between the lower edge portion of the sleeve 240 and the extending portion 224, the lubricating fluid filled in the bearing clearance B forms the first liquid-vapor interface F1 and the second liquid-vapor interface F2.

Also, upper and lower radial dynamic pressure generating grooves 248 and 249 may be formed in an inner surface of the sleeve 240 in order to generate fluid dynamic pressure by the medium of the lubricating fluid filled in the bearing clearance B when the sleeve 240 is rotated.

In this case, however, the upper and lower radial dynamic pressure generating grooves 248 and 249 are not limited to the case that they are formed in the inner surface of the sleeve 240 as shown in FIG. 9. That is, the upper and lower radial dynamic pressure generating grooves 248 and 249 may be formed in an outer circumferential surface of the shaft 230 and may have various shapes such as a herringbone shape, a spiral shape, a helical shape, and the like.

The hub 250 is coupled to the sleeve 240 and rotated cooperatively according to an operation of the sleeve 240.

The hub 250 may include a hub body 252 having an insertion portion in which the upper thrust member 260 is insertedly disposed therein, a mounting portion 254 extending from the edge of the hub body 252 and having an inner surface allowing a magnet assembly 280 to be mounted thereon, and an extending portion 256 extending from an end of the mounting portion 254 outwardly in the radial direction.

Meanwhile, a lower edge portion of an inner surface of the hub body 252 may be joined to an outer surface of the sleeve 240. Namely, the lower edge portion of the inner surface of the hub body 252 may be joined to the junction surface 245 of the sleeve 240 through an adhesive and/or welding.

Thus, when the hub 250 is rotated, the sleeve 240 may be rotated together with the hub 250.

Also, the mounting portion 254 is formed to extend downwardly from the hub body 252 in the axial direction. The magnet assembly 280 may be fixedly installed on the inner surface of the mounting portion 254.

Meanwhile, the magnet assembly 280 may include a yoke 282 fixedly installed on an inner surface of the mounting portion 254 and a magnet 284 installed on an inner surface of the yoke 282.

The magnet 284 may have an annular shape and may be a permanent magnet having an N pole and an S pole alternately magnetized in the circumferential direction to generate a magnetic field having a certain strength.

Meanwhile, the magnet 284 is disposed in a facing manner on a front end of the stator core 202 around which the coil 201 is wound, and generates driving force enabling the hub 250 to be rotated according to electromagnetic interaction with the stator core 202 with the coil 201 wound therearound.

The upper thrust member 260 is fixedly installed on an upper edge portion of the shaft 230, and forms a liquid-vapor interface together with the sleeve 240 or the hub 250.

The upper thrust member 260 may include a body 262 having an inner surface having an inner surface joined to the shaft 230 and a protrusion portion 264 extending from the body 262 to form a liquid-vapor interface together with the sloped portion 263.

The protrusion portion 264 extends downwardly from the body 262 in the axial direction. An inner surface of the protrusion portion 264 may face an outer surface of the sleeve 240, and an outer surface of the protrusion portion 264 may face an inner surface of the hub 250.

Also, the protrusion portion 264 may extend from the body 262 such that it is parallel to the shaft 230.

Also, the upper thrust member 260 is a fixed member fixedly installed together with the base member 210, the lower thrust member 220, and the shaft 230, constituting the stator.

Meanwhile, since the upper thrust member 260 is fixedly installed on the shaft 230 and the sleeve 240 is rotated together with the hub 250, the first liquid-vapor interface F1 may be formed between the hub 250 and the protrusion portion 264. Thus, the inner surface of the hub 250 may have a sloped portion 254 formed to be sloped.

The protrusion portion 264 of the upper thrust member 260 is disposed in a space between the sleeve 240 and the hub 250. A space formed between the sleeve 24 and a lower surface of the body 262 of the upper thrust member 260, a space formed between an outer surface of the sleeve 240 and an inner surface of the protrusion portion 264, and a space formed between an outer surface of the protrusion 264 and an inner surface of the hub 250, the spaces having a labyrinth shape, are filled with a lubricating fluid to form a sealing portion.

Thus, as illustrated in FIG. 9, the first liquid-vapor interface F1 may be formed in the space formed between the outer surface of the sleeve 240 and the inner surface of the protrusion portion 264, as well as in the space formed between the outer surface of the upper thrust member 260 and the inner surface of the hub 250. Of course, in the latter case, the outer surface of the sleeve 240 or the inner surface of the protrusion portion 264 is formed to be sloped to facilitate sealing of the lubricating fluid.

Meanwhile, the upper thrust dynamic pressure generating grooves 248 may be formed in at least one of a lower surface of the upper thrust member 260 and an upper surface of the sleeve 240 disposed to face the lower surface of the upper thrust member 260 in order to generate a thrust dynamic pressure.

The upper thrust member 260 may also serve as a sealing member preventing the lubricating fluid filled in the bearing clearance B from being leaked to an upper side.

Also, the cap member 290 may be provided to cover an upper portion of the space formed by the upper thrust member 260 and the hub 250.

The cap member 290 may have an annular shape and an outer edge thereof may be fixed at an inner side of the hub 250.

Figure 11:
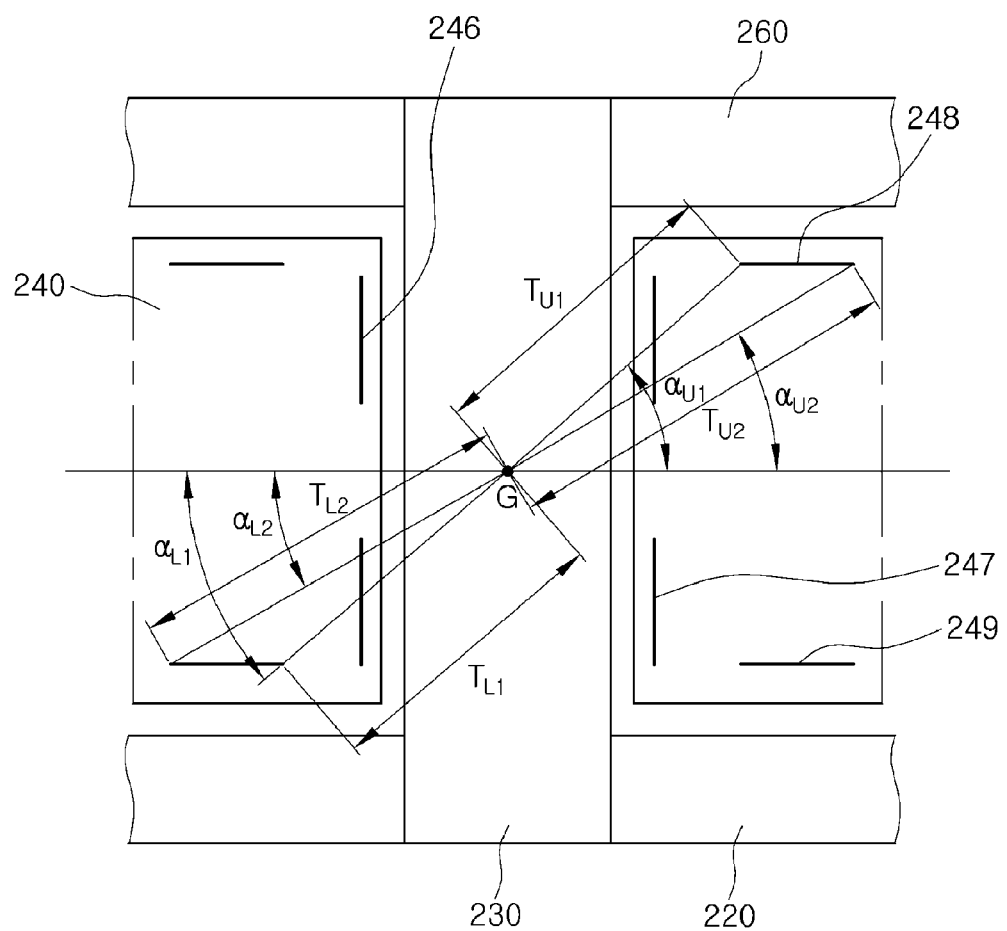
FIG. 11 is a view illustrating definitions of various parameters for mathematically calculating (or estimating) the mechanism of FIG. 10.

FIG. 10 is a view illustrating definitions of various parameters for applying the mechanism of FIG. 2 to the spindle motor of FIG. 9 according to an embodiment of the present invention, and FIG. 11 is a view illustrating definitions of various parameters for mathematically calculating (or estimating) the mechanism of FIG. 10.

Referring to FIG. 10, in comparison to the embodiment of FIG. 2 having a single thrust structure, the embodiment of FIG. 10 has a double thrust structure including two thrust bearings. Thus, when the sleeve 240 as a rotary member is sloped, force resistant to the sloping is generated in the upper and lower thrust bearings. Namely, Formula 1 in the embodiment of FIG. 2 may be expressed as Embodiment 16 in the embodiment of FIG. 10.

$$S_{TU} + S_{TL} > S_U + S_L \qquad \text{[Formula 16]}$$

In that Formula 16 is applied to the double thrust structure, the principle applied to the case in which the rotary member of the spindle motor 100 according to an embodiment of the present invention described with reference to FIGS. 1 through 8 is sloped, may be applied as is, except that the fluid dynamic pressure $S_{TL}$ acting between the sleeve 240 and the lower thrust member 220 is added to Formula 1.

Referring to FIGS. 10 and 11, parameters and mathematical calculation methods for solving and organizing Formula 16 shown above are described.

Respective parameters may be defined with reference to FIGS. 10 and 11 as follows. Here, in comparison to the spindle motor 100 illustrated in FIG. 1, the spindle motor 200 according to the present embodiment is different from the spindle motor 100, in that it has a fixed shaft structure and a double thrust structure, and the same principle as that applied to Formula 1 to Formula is applied. Thus, the same symbols are used for the parameters having the same meaning and additional parameters will be described.

$T_{U1}$ is a distance from the center of gravity of the rotary member to an inner edge of the upper thrust dynamic pressure generating grooves, $T_{U2}$ is a distance from the center of gravity of the rotary member to an outer edge of the upper thrust dynamic pressure generating grooves, $\alpha_{U1}$ is a smaller angle among angles formed between a line extended through the center of gravity of the rotary member in the radial direction and a line connecting the center of gravity of the rotary member and the inner edge of the upper thrust dynamic pressure generating grooves, $\alpha_{U2}$ is a smaller angle among angles formed between a line extended through the center of gravity of the rotary member in the radial direction and a line connecting the center of gravity of the rotary member and the outer edge of the upper thrust dynamic pressure generating grooves, $L_{TU}$ is a length of the upper thrust dynamic pressure generating grooves in the radial direction, $T_{L1}$ is a distance from the center of gravity of the rotary member to an inner edge of the lower thrust dynamic pressure generating grooves, $T_{L2}$ is a distance from the center of gravity of the rotary member to an outer edge of the lower thrust dynamic pressure generating grooves, $\alpha_{L1}$ is a smaller angle among angles formed between a line extended through the center of gravity of the rotary member in the radial direction and a line connecting the center of gravity of the rotary member and the inner edge of the lower thrust dynamic pressure generating grooves, $\alpha_{L2}$ is a smaller angle among angles formed between a line extended through the center of gravity of the rotary member in the radial direction and a line connecting the center of gravity of the rotary member and the outer edge of the lower thrust dynamic pressure generating grooves, $L_{TL}$ is a length of the lower thrust dynamic pressure generating grooves in the radial direction.

Meanwhile, parameters related to the radial dynamic pressure generating grooves 246 and 247 are the same as those described above with reference to FIG. 6, so a repeated description thereof will be omitted.

Also, in an embodiment of the present invention, the center of gravity G of the rotary member refers to a final state in which a disc, a clamp, and the like, are installed in the spindle motor. The spindle motor 200 illustrated in FIG. 9 is in a state in which a disc, a clamp, and the like, are not installed, and the center of gravity G illustrated in FIGS. 10 and 11 refers to the center of gravity of the rotary member with a disc, a clamp, and the like, installed therein.

Referring to Formula 2 to Formula 6, an area of each term may be calculated to obtain Formula 16.

Formula 17 may be obtained by substituting Formula 2 to Formula 6 to Formula 16

$$(T_{U1} \cos \alpha_{U1} + T_{U2} \cos \alpha_{U2})L_{TU} + (T_{L1} \cos \alpha_{L1} + T_{L2} \cos \alpha_{L2})L_{TL} > (R_{U1} \sin \beta_{U1} + R_{U2} \sin \beta_{U2})L_U + (R_{L1} \sin \beta_{L1} + R_{L2} \sin \beta_{L2})L_L \quad \text{[Formula 17]}$$

Meanwhile, the center of gravity of the rotary member may come at various positions according to the structure and shape of the rotary member. In particular, in case of the spindle motor 200 according to an embodiment of the present invention, when the center of gravity of the rotary member is formed within the upper radial dynamic pressure generating grooves or the lower radial dynamic pressure generating grooves region, the relationship between the thrust dynamic pressure generating grooves and the radial dynamic pressure generating groove can be simply established.

When the center of gravity G of the rotary member is positioned in the upper dynamic pressure generating groove region and an upper region thereof, the area $S_U$ according to the difference between the gaps in the portion in which the upper radial dynamic pressure generating grooves 248 is formed before and after the sleeve 240 is sloped, among the terms of Formula 16, has a value as small as negligible. Thus, Formula 16 may be simplified into Formula 18 shown below.

$$(T_{U1} \cos \alpha_{U1} + T_{U2} \cos \alpha_{U2})L_{TU} + (T_{L1} \cos \alpha_{L1} + T_{L2} \cos \alpha_{L2})L_{TL} > (R_{L1} \sin \beta_{L1} + R_{L2} \sin \beta_{L2})L_L \quad \text{[Formula 18]}$$

Also, when the center of gravity G of the rotary member is positioned in the lower dynamic pressure generating groove region and a lower region thereof, the area $S_L$ according to the difference between the gaps in the portion in which the lower radial dynamic pressure generating grooves 247 is formed before and after the sleeve 240 is sloped, among the terms of Formula 16, has a value as small as negligible. Thus, Formula 16 may be simplified into Formula 19 shown below.

$$(T_{U1} \cos \alpha_{U1} + T_{U2} \cos \alpha_{U2})L_{TU} + (T_{L1} \cos \alpha_{L1} + T_{L2} \cos \alpha_{L2})L_{TL} > (R_{U1} \sin \beta_{U1} + R_{U2} \sin \beta_{U2})L_U \quad \text{[Formula 19]}$$

Figure 12A:
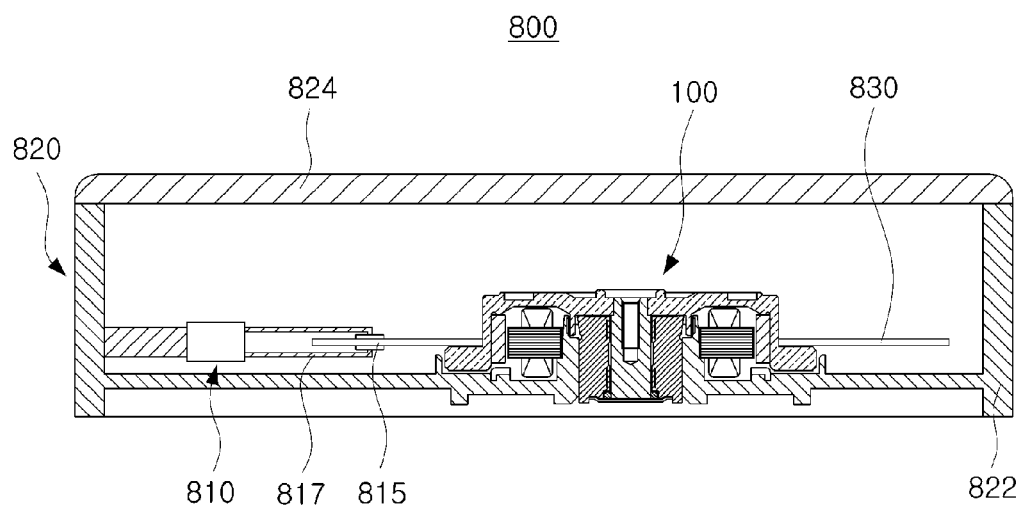
FIGS. 12(a) and 12(b) are schematic cross-sectional views illustrating a disc driving device using a spindle motor, respectively, according to an embodiment of the present invention.
Figure 12B:
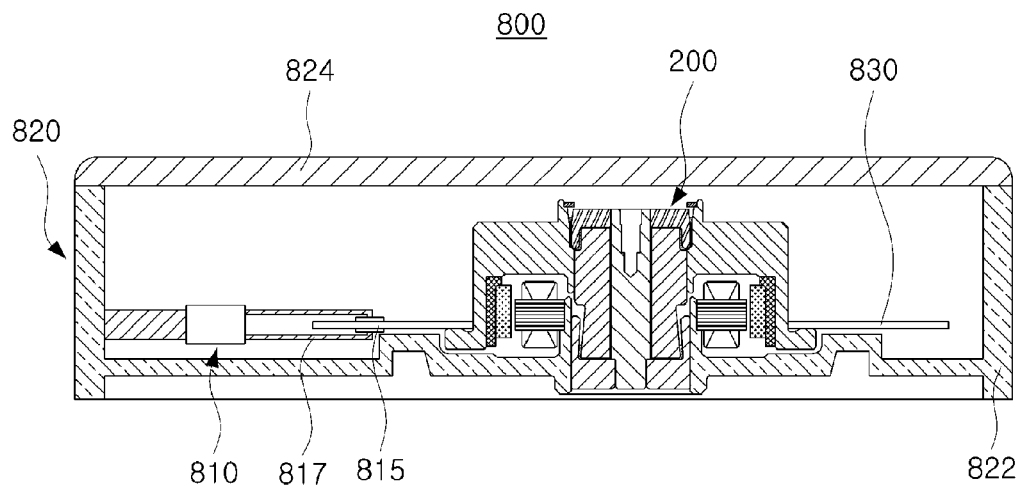

FIGS. 12(*a*) and 12(*b*) are schematic cross-sectional views illustrating a disc driving device using a spindle motor, respectively, according to an embodiment of the present invention.

Referring to FIGS. 12(*a*) and 12(*b*), a disc driving device 800 in which the spindle motor 100 or 200 is mounted is a hard disc drive and may include a spindle motor 100 or 200, a head transfer unit 810, and a housing 820. A thickness standard of the recording disc driving device 800 is 5 mm or smaller.

The spindle motor 100 or 200 has the characteristics of the spindle motor according to an embodiment of the present invention as described above, and may include a recording disc 830 installed therein.

The head transfer unit 810 may transfer a magnetic head 815 detecting information of the recording disc 830 mounted on the spindle motor 100 or 200 to a certain position above a surface of the recording disc desired to be detected.

Here, the magnetic head 815 may be disposed on a support portion 817 of the head transfer unit 810.

In order to form an internal space for accommodating the spindle motor 100 and the head transfer unit 810, the housing 820 may include a motor-mounted plate 822 and a top cover 824 shielding an upper portion of the motor-mounted plate 822.

The head transfer unit 810 is configured as a voice coil motor (VCM). In this case, however, if power supplied to the VCM is suddenly cut, the magnetic head 815 may be positioned on the disc as is to potentially damage information recorded on the disc.

In order to solve this problem, in the recording disc driving device 800, the VCM is driven by using back electromotive force (B-EMF) of the spindle motor. The VCM may be driven to be returned to its initial position by the B-EMF, a process known as emergency parking.

Namely, when supply of power is cut while the spindle motor is being driven, electrical energy is generated by using rotary force of the disc and supplied to the VCM.

In the case of a 2.5-inch disc, emergency parking of the head can be implemented when B-EMF is secured to be 0.35V/krpm or more. In this respect, in the related art disc driving device, B-EMF is not problematic, but in case of a 2.5-inch type 5 mm disc driving device, securing B-EMF is an issue, due to limitations in the height of a core.

Thus, in order to secure B-EMF reduced in the case that the height of the core is low, the core is required to be designed to have a length extending in a radial direction. However, an inner diameter of the 2.5-inch type disc is determined to be 20 mm, so there is a limitation in the length of the core in the radial direction.

Since sufficient length of the core in the radial direction should be secured within the determined range of the inner diameter of the disc, the length of the sleeve in which the thrust bearing is formed in the radial direction is also limited by much as the length of the core in the radial direction.

Thus, it is important to design to satisfy the length of the core in the radial direction to secure B-EMF and the length of the thrust bearing in the radial direction to secure slope rigidity.

As set forth above, according to embodiments of the invention, in the thin spindle motor, even in the case that the rotary member is sloped to one side, the rotary member can have slope rigidity enough to be returned to its original position.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
a rotary member; and
a fixed member rotatably supporting the rotary member by fluid dynamic pressure,
wherein upper radial dynamic pressure generating grooves and lower radial dynamic pressure generating grooves are formed in at least one of surfaces of the rotary member and the fixed member facing each other in a radial direction,
thrust dynamic pressure generating grooves are formed in at least one of surfaces of the rotary member and the fixed member facing each other in an axial direction, and Equation 1 is satisfied, $$(T_1 \cos \alpha_1 + T_2 \cos \alpha_2)L_T > (R_{U1} \sin \beta_{U1} + R_{U2} \sin \beta_{U2})L_U + (R_{L1} \sin \beta_{L1} + R_{L2} \sin \beta_{L2})L_L \quad \text{[Equation 1]}$$

wherein $T_1$ is a distance from the center of gravity of the rotary member to an inner edge of the thrust dynamic pressure generating grooves, $T_2$ is a distance from the center of gravity of the rotary member to an outer edge of the thrust dynamic pressure generating grooves, $\alpha_1$ is a smaller angle among angles formed between a line extended through the center of gravity of the rotary member in the radial direction and a line connecting the center of gravity of the rotary member and the inner edge of the thrust dynamic pressure generating grooves, $\alpha_2$ is a smaller angle among angles formed between a line extended through the center of gravity of the rotary member in the radial direction and a line connecting the center of gravity of the rotary member and the outer edge of the thrust dynamic pressure generating grooves, $L_T$ is a length of the thrust dynamic pressure generating grooves in the radial direction, $R_{U1}$ is a distance from the center of gravity of the rotary member to a lower edge of the upper radial dynamic pressure generating grooves, $R_{U2}$ is a distance from the center of gravity of the rotary member to an upper edge of the upper radial dynamic pressure generating grooves, $\beta_{U1}$ is a smaller angle among angles formed between a line extended through the center of gravity of the rotary member in the radial direction and a line connecting the center of gravity of the rotary member and the lower edge of the upper radial dynamic pressure generating grooves, $\beta_{U2}$ is a smaller angle among angles formed between a line extended through the center of gravity of the rotary member in the radial direction and a line connecting the center of gravity of the rotary member and the upper edge of the upper radial dynamic pressure generating grooves, $L_U$ is a length of the upper radial dynamic pressure generating grooves in the axial direction, $R_{L1}$ is a distance from the center of gravity of the rotary member to the lower edge of the lower radial dynamic pressure generating grooves, $R_{L2}$ is a distance from the center of gravity of the rotary member to the upper edge of the lower radial dynamic pressure generating grooves, $\beta_{L1}$ is a smaller angle among angles formed between a line extended through the center of gravity of the rotary member in the radial direction and a line connecting the center of gravity of the rotary member and the lower edge of the lower radial dynamic pressure generating grooves, $\beta_{L2}$ is a smaller angle among angles formed between a line extended through the center of gravity of the rotary member in the radial direction and a line connecting the center of gravity of the rotary member and the upper edge of the lower radial dynamic pressure generating grooves, and $L_L$ is a length of the lower radial dynamic pressure generating grooves in the axial direction.

2. The spindle motor of claim 1, wherein in the case that the center of gravity of the rotary member is positioned above a lower edge of the upper radial dynamic pressure generating grooves in the axial direction, the term regarding $L_U$ in Equation 1 is 0, and Equation 2 is satisfied, $$(T_1 \cos \alpha_1 + T_2 \cos \alpha_2)L_T > (R_{L1} \sin \beta_{L1} + R_{L2} \sin \beta_{L2})L_L. \quad \text{[Equation 2]}$$

3. The spindle motor of claim 1, wherein in the case that the center of gravity of the rotary member is positioned below an upper edge of the lower radial dynamic pressure generating grooves in the axial direction, the term regarding $L_L$ in Equation 1 is 0, and Equation 3 is satisfied, $$(T_1 \cos \alpha_1 + T_2 \cos \alpha_2)L_T > (R_{U1} \sin \beta_{U1} + R_{U2} \sin \beta_{U2})L_U. \quad \text{[Equation 3]}$$

4. The spindle motor of claim 1, wherein the rotary member comprises a shaft, a hub extending outwardly from an upper edge of the shaft in the radial direction, and a magnet and a disc installed on the hub, and
the fixed member comprises a sleeve rotatably supporting the shaft by fluid dynamic pressure and a core disposed to face the magnet and having a coil wound therearound.

5. The spindle motor of claim 4, wherein the upper and lower radial dynamic pressure generating grooves are formed in at least one of surfaces of the shaft and the sleeve facing each other, and
the thrust dynamic pressure generating grooves are formed in at least one of surfaces of the hub and the sleeve facing each other.

6. The spindle motor of claim 5, wherein a bearing clearance filled with a fluid is formed between surfaces of the shaft and the sleeve facing each other, and
the bearing clearance falls within 0.0005 to 0.002 times a diameter of the shaft.

7. The spindle motor of claim 4, wherein when power supply is stopped, back electromotive force (B-EMF) is 0.35V/krpm or more.

8. A hard disc drive comprising:
a spindle motor according to claim 4;
a magnetic head for writing data to and reading data from the disc; and
a head transfer unit transferring the magnetic head to a certain position above the disc,
wherein a thickness of the hard disc drive is 5 mm or smaller.

9. A spindle motor comprising:
a rotary member; and
a fixed member rotatably supporting the rotary member by fluid dynamic pressure,
wherein upper radial dynamic pressure generating grooves and lower radial dynamic pressure generating grooves are formed in at least one of surfaces of the rotary member and the fixed member facing each other in a radial direction,
upper thrust dynamic pressure generating grooves are formed in at least one of surfaces of an upper portion of the rotary member and the fixed member facing each other in an axial direction,
lower thrust dynamic pressure generating grooves are formed in at least one of surfaces of a lower portion of the rotary member and the fixed member facing each other in an axial direction, and Equation 4 is satisfied, $$(T_{U1}\cos\alpha_{U1}+T_{U2}\cos\alpha_{U2})L_{TU}+(T_{L1}\cos\alpha_{L1}+T_{L2}\cos\alpha_{L2})L_{TL} > (R_{U1}\sin\beta_{U1}+R_{U2}\sin\beta_{U2})L_U+(R_{L1}\sin\beta_{L1}+R_{L2}\sin\beta_{L2})L_L \quad \text{[Equation 4]}$$

wherein $T_{U1}$ is a distance from the center of gravity of the rotary member to an inner edge of the upper thrust dynamic pressure generating grooves, $T_{U2}$ is a distance from the center of gravity of the rotary member to an outer edge of the upper thrust dynamic pressure generating grooves, $\alpha_{U1}$ is a smaller angle among angles formed between a line extended through the center of gravity of the rotary member in the radial direction and a line connecting the center of gravity of the rotary member and the inner edge of the upper thrust dynamic pressure generating grooves, $\alpha_{U2}$ is a smaller angle among angles formed between a line extended through the center of gravity of the rotary member in the radial direction and a line connecting the center of gravity of the rotary member and the outer edge of the upper thrust dynamic pressure generating grooves, $L_{TU}$ is a length of the upper thrust dynamic pressure generating grooves in the radial direction, $T_{L1}$ is a distance from the center of gravity of the rotary member to an inner edge of the lower thrust dynamic pressure generating grooves, $T_{L2}$ is a distance from the center of gravity of the rotary member to an outer edge of the lower thrust dynamic pressure generating grooves, $\alpha_{L1}$ is a smaller angle among angles formed between a line extended through the center of gravity of the rotary member in the radial direction and a line connecting the center of gravity of the rotary member and the inner edge of the lower thrust dynamic pressure generating grooves, $\alpha_{L2}$ is a smaller angle among angles formed between a line extended through the center of gravity of the rotary member in the radial direction and a line connecting the center of gravity of the rotary member and the outer edge of the lower thrust dynamic pressure generating grooves, $L_{TL}$ is a length of the lower thrust dynamic pressure generating grooves in the radial direction, $R_{U1}$ is a distance from the center of gravity of the rotary member to the lower edge of the upper radial dynamic pressure generating grooves, $R_{U2}$ is a distance from the center of gravity of the rotary member to the upper edge of the upper radial dynamic pressure generating grooves, $\beta_{U1}$ is a smaller angle among angles formed between a line extended through the center of gravity of the rotary member in the radial direction and a line connecting the center of gravity of the rotary member and the lower edge of the upper radial dynamic pressure generating grooves, $\beta_{U2}$ is a smaller angle among angles formed between a line extended through the center of gravity of the rotary member in the radial direction and a line connecting the center of gravity of the rotary member and the upper edge of the upper radial dynamic pressure generating grooves, $L_U$ is a length of the upper radial dynamic pressure generating grooves in axial direction, $R_{L1}$ is a distance from the center of gravity of the rotary member to the lower edge of the lower radial dynamic pressure generating grooves, $R_{L2}$ is a distance from the center of gravity of the rotary member to the upper edge of the lower radial dynamic pressure generating grooves, $\beta_{L1}$ is a smaller angle among angles formed between a line extended through the center of gravity of the rotary member in the radial direction and a line connecting the center of gravity of the rotary member and the lower edge of the lower radial dynamic pressure generating grooves, $\beta_{L2}$ is a smaller angle among angles formed between a line extended through the center of gravity of the rotary member in the radial direction and a line connecting the center of gravity of the rotary member and the upper edge of the lower radial dynamic pressure generating grooves, and $L_L$ is a length of the lower radial dynamic pressure generating grooves in the axial direction.

10. The spindle motor of claim 9, wherein in the case that the center of gravity of the rotary member is positioned above a lower edge of the upper radial dynamic pressure generating grooves in the axial direction, the term regarding $L_U$ in Equation 4 is 0, and Equation 5 is satisfied, $$(T_{U1}\cos\alpha_{U1}+T_{U2}\cos\alpha_{U2})L_{TU}+(T_{L1}\cos\alpha_{L1}+T_{L2}\cos\alpha_{L2})L_{TL} > (R_{U1}\sin\beta_{L1}+R_{L2}\sin\beta_{L2})L_L. \quad \text{[Equation 5]}$$

11. The spindle motor of claim 9, wherein in the case that the center of gravity of the rotary member is positioned below an upper edge of the lower radial dynamic pressure generating grooves in the axial direction, the term regarding $L_L$ in Equation 4 is 0, and Equation 6 is satisfied, $$(T_{U1}\cos\alpha_{U1}+T_{U2}\cos\alpha_{U2})L_{TU}+(T_{L1}\cos\alpha_{L1}+T_{L2}\cos\alpha_{L2})L_{TL} > (R_{U1}\sin\beta_{U1}+R_{U2}\sin\beta_{U2})L_U. \quad \text{[Equation 6]}$$

12. The spindle motor of claim 9, wherein the rotary member comprises a hollow-type sleeve, a hub extending outwardly of the sleeve in the radial direction, and a magnet and a disc installed on the hub, and
the fixed member comprises a shaft positioned in the hollow of the sleeve to rotatably support the sleeve by fluid dynamic pressure, upper and lower thrust members extending outwardly in the radial direction of the shaft, and a core disposed to correspond to the magnet and having a coil wound therearound.

13. The spindle motor of claim 12, wherein the upper and lower radial dynamic pressure generating grooves are formed in at least one of surfaces of the shaft and the sleeve facing each other,
the upper thrust dynamic pressure generating grooves are formed in at least one of surfaces of the upper thrust member and the sleeve facing each other, and
the lower thrust dynamic pressure generating grooves are formed in at least one of surfaces of the lower thrust member and the sleeve facing each other.

14. The spindle motor of claim 13, wherein a bearing clearance filled with a fluid is formed between surfaces of the shaft and the sleeve facing each other, and
the bearing clearance falls within 0.0005 to 0.002 times a diameter of the shaft.

15. The spindle motor of claim 12, wherein when power supply is stopped, back electromotive force (B-EMF) is 0.35V/krpm or more.

16. A hard disc drive comprising:
a spindle motor according to claim 12;
a magnetic head for writing data to and reading data from the disc; and
a head transfer unit transferring the magnetic head to a certain position above the disc, wherein a thickness of the hard disc drive is 5 mm or smaller.

* * * * *

UNITED STATES PATENT AND TRADEMARK OFFICE
CERTIFICATE OF CORRECTION

PATENT NO.        : 8,605,385 B1
APPLICATION NO.   : 13/771626
DATED             : December 10, 2013
INVENTOR(S)       : Jung Hwan Song et al.

It is certified that error appears in the above-identified patent and that said Letters Patent is hereby corrected as shown below:

In the Claims

In Column 26, Line 19, In Claim 10, delete "$R_{U1}$" and insert -- $R_{L1}$ --, therefor.

Signed and Sealed this
Twenty-fifth Day of March, 2014

Michelle K. Lee
*Deputy Director of the United States Patent and Trademark Office*